US012769100B2

(12) United States Patent
Okada

(10) Patent No.: US 12,769,100 B2
(45) Date of Patent: Oct. 20, 2026

(54) ZOOM LENS AND IMAGING DEVICE

(71) Applicant: Tamron Co., Ltd., Saitama (JP)

(72) Inventor: Keisuke Okada, Saitama (JP)

(73) Assignee: TAMRON CO., LTD., Saitama (JP)

( * ) Notice: Subject to any disclaimer, the term of this patent is extended or adjusted under 35 U.S.C. 154(b) by 179 days.

(21) Appl. No.: 18/934,719

(22) Filed: Nov. 1, 2024

(65) Prior Publication Data

US 2025/0208389 A1 Jun. 26, 2025

(30) Foreign Application Priority Data

Dec. 22, 2023 (JP) ................................ 2023-217173

(51) Int. Cl.
*G02B 15/14* (2006.01)
*G02B 15/16* (2006.01)
*G02B 27/64* (2006.01)

(52) U.S. Cl.
CPC ......... *G02B 15/1451* (2019.08); *G02B 15/16* (2013.01); *G02B 27/646* (2013.01)

(58) Field of Classification Search
CPC ... G02B 15/1451; G02B 15/16; G02B 27/646
See application file for complete search history.

(56) References Cited

U.S. PATENT DOCUMENTS

2020/0174236 A1 6/2020 Kikuchi
2021/0055531 A1 2/2021 Nakazawa et al.
2023/0367109 A1 * 11/2023 Koida .................. G02B 15/20

FOREIGN PATENT DOCUMENTS

JP 2019-191445 A 10/2019
JP 2020-086305 A 6/2020
JP 2021-033010 A 3/2021

* cited by examiner

*Primary Examiner* — James A Dudek
(74) *Attorney, Agent, or Firm* — Paratus Law Group, PLLC

(57) ABSTRACT

A zoom lens and an imaging device that achieve both high optical performance and compactness of the product. The zoom lens includes, in order from the object side, a first lens group having positive refractive power, a second lens group having negative refractive power, and a rear group having positive refractive power. The rear group includes, in order from the object side, an intermediate lens group M1 having positive refractive power, and an intermediate lens group M2 having positive refractive power, and has specific optical characteristics expressed by specific expressions.

24 Claims, 13 Drawing Sheets

ZOOM LENS AND IMAGING DEVICE

CROSS-REFERENCE TO RELATED APPLICATIONS

This application is based on and claims the benefit of priority from Japanese Patent Application No. 2023-217173, filed on Dec. 22, 2023, the entire contents of which are incorporated herein by reference.

BACKGROUND OF THE INVENTION

Technical Field

The present invention relates to a zoom lens and an imaging device.

Related Art

In imaging devices using solid-state image sensors, such as digital cameras and video cameras, the recent trend toward higher pixel counts in solid-state image sensors has led to a demand for even higher performance in lens systems. In addition, as cameras become more compact, there is an increasing demand for more compact optical systems.

Under these circumstances, for example, inventions of zoom lenses are disclosed in JP 2019-191445 A, JP 2020-086305 A, and JP 2021-033010 A. JP 2019-191445 A discloses a zoom lens, which is a so-called standard zoom for single-lens reflex cameras. Patent document 2 discloses a zoom lens, which is a so-called high-magnification zoom for mirrorless cameras. JP 2021-033010 A discloses a zoom lens, which is a so-called large aperture zoom for mirrorless cameras.

SUMMARY OF THE INVENTION

In both of the zoom lenses disclosed in JP 2019-191445 A and JP 2020-086305 A, the magnification of the lens group arranged third from the object side is positive, so that light emitted toward the image surface side of the lens group arranged third from the object side becomes divergent light, and the lens arranged on the image surface side of the lens group arranged third from the object side becomes large. For this reason, the zoom lens described in JP 2019-191445 A has difficulty in reducing the diameter of a product. The zoom lenses described in JP 2019-191445 A and JP 2020-086305 A also have a large amount of movement of the fourth lens group during zooming, making it difficult to reduce the diameter and length of the product.

In the zoom lens disclosed in JP 2021-033010 A, the lens group arranged third from the object side during zooming is a zooming-reducing lens group, has weak refractive power, and the movement distance of each lens group is large. For this reason, the zoom lens described in JP 2021-033010 A is difficult to make the product compact.

Therefore, an object of the present invention is to provide a zoom lens and an imaging device that achieve both high optical performance and compactness of the product, even in a zoom lens with a zooming ratio of more than 10×.

SUMMARY OF THE INVENTION

In order to solve the above problem, a zoom lens according to one aspect of the present invention is a zoom lens having a plurality of lens groups, the zoom lens including, in order from an object side:

a first lens group having positive refractive power;

a second lens group having negative refractive power; and a rear group being a set of lens groups and having positive refractive power as a whole, wherein the rear group includes, in order from an object side, an intermediate lens group M1 having positive refractive power, and an intermediate lens group M2 having positive refractive power, an interval between adjacent lens groups is changed during zooming from a wide angle end to a telephoto end, the intermediate lens group M1 includes, in order from the object side, an A group being a set of lenses and having positive refractive power, a B group being a set of lenses and having negative refractive power, and a C group being a set of lenses and having positive refractive power, and the zoom lens further satisfies either a condition A or a condition B below, the condition A is that at least one lens included in either the intermediate lens group M1 or the intermediate lens group M2 is an anti-vibration lens that moves in a direction intersecting an optical axis of the zoom lens, and when a lens group closest to an image surface side in the rear group is defined as a lens group L, following expressions (1) and (2) are satisfied, $$-1000 < \beta m1w < 0.00 \quad (1)$$

$$-5.00 < mL/fw < -0.01 \quad (2)$$

here, $\beta m1w$ is a lateral magnification of the intermediate lens group M1 during infinity focus at a wide angle end, mL is a movement distance of the lens group L during zooming from a wide angle end to a telephoto end when a movement distance from an object side to an image surface side is considered positive, and fw is a focal length of the zoom lens at a wide angle end;

the condition B is at least one lens included in the intermediate lens group M1 and in a lens group closer to an image surface side than the intermediate lens group M1 is an anti-vibration lens that moves in a direction intersecting an optical axis of the zoom lens, and following expressions (3) and (4) are satisfied, $$0.20 < Lt/ft < 1.30 \quad (3)$$

$$0.10 < fC/fM1 < 9.50 \quad (4)$$

here,

Lt is a total length of the zoom lens at a telephoto end, ft is a focal length of the zoom lens at a telephoto end, fC is a focal length of the C group, and fM1 is a focal length of the intermediate lens group M1.

In order to solve the aforementioned problem, an imaging device according to one aspect of the present invention includes a zoom lens as described above and an image sensor on an image surface side of the zoom lens, the image sensor converting an optical image formed by the zoom lens into an electrical signal.

Effects of the Invention

According to one aspect of the present invention, it is possible to provide a zoom lens and an imaging device that achieve both high optical performance and compactness of the product, even in a zoom lens with a zooming ratio of more than 10×.

DESCRIPTION OF THE EMBODIMENTS

Figure 1:
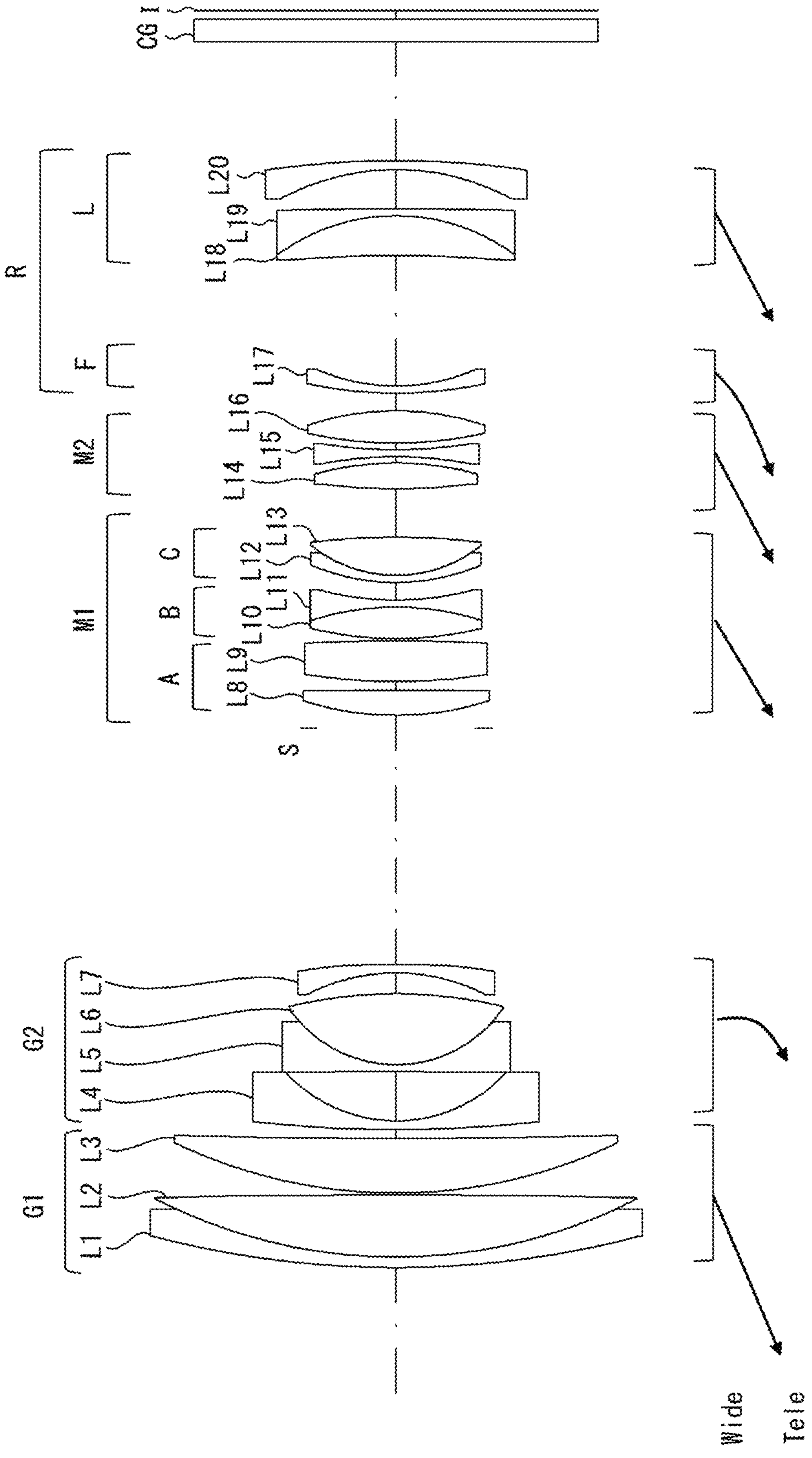
FIG. 1 is a lens cross-sectional view schematically illustrating an optical configuration of a zoom lens at a wide angle end according to Example 1.

Hereinafter, embodiments of a zoom lens and an imaging device according to the present invention are described. More specifically, the present embodiment relates to a zoom lens and an imaging device suitable for an imaging device using a solid-state image sensor (CCD, CMOS, etc.), such as a digital still camera or a digital video camera. Here, the zoom lens and imaging device described below are one aspect of the zoom lens and imaging device according to the present invention, and the zoom lens and imaging device according to the present invention are not limited to the following aspect.

In this description, the term "zoom lens" is a general term for anything that includes the optical characteristics specified in the present invention, and refers to either or both of the optical system itself that exhibits the optical characteristics and an article that includes the optical system.

1. Zoom Lens 1-1. Optical Configuration

The optical configuration of a zoom lens according to one embodiment of the present invention is described. The zoom lens according to the present embodiment is a zoom lens having a plurality of lens groups. The zoom lens includes, in order from the object side, a first lens group having positive refractive power, a second lens group having negative refractive power, and a rear group having positive refractive power as a whole. This configuration is preferable from the viewpoint of shortening the back focus and making the product compact.

In the present description, the term "lens group" refers to a set of one or more lenses that are linked in a zooming operation. During a zooming operation, lenses in the lens group move while maintaining their relative positional relationship. The zooming operation is performed by changing the interval between the lens groups, and the interval between lenses belonging to the same lens group does not change during the zooming operation.

The rear group is a set of lens groups, and has positive refractive power as a whole. The rear group includes, in order from the object side, an intermediate lens group M1 and an intermediate lens group M2.

The intermediate lens group M1 has positive refractive power as a whole. This configuration converts divergent light from the second lens group having negative refractive power into convergent light, and is therefore preferable from the viewpoint of suppressing the height of light rays that passes through the lens arranged on the image surface side of the M1 group, and making the product compact. The intermediate lens group M1 includes, in order from the object side, an A group which is a set of lenses, a B group which is a set of lenses, and a C group which is a set of lenses.

The A group has positive refractive power. This configuration converts divergent light from the second lens group having negative refractive power into convergent light, and is therefore preferable from the viewpoint of suppressing the height of light rays that passes through the lens arranged on the image surface side of A group, and making the product compact.

The B group has negative refractive power. This configuration is preferable from the viewpoint of correcting the spherical aberration and field curvature that occur in A group. The B group has at least one concave lens and one convex lens, which makes it possible to correct chromatic aberration within B group. Therefore, this configuration is preferable from the viewpoint of further suppressing the fluctuation in chromatic aberration during zooming. It is preferable, from the viewpoint of suppressing the influence of manufacturing errors during assembly of the zoom lens, that the B group has a cemented lens including one or more concave lenses and one or more convex lenses.

The C group has positive refractive power. This configuration converts divergent light from the B group having negative refractive power into convergent light, and is therefore preferable from the viewpoint of suppressing the height of light rays that passes through the lens arranged on the image surface side of the C group, and making the product compact. It is preferable, from the viewpoint of correcting field curvature and lateral chromatic aberration, that the C group has a concave lens. The C group has at least one concave lens and one convex lens, which makes it possible to correct chromatic aberration within C group. For this reason, it is preferable, from the viewpoint of suppressing fluctuations in chromatic aberration during blur correction, that the C group has at least one concave lens and one convex lens. It is preferable, from the viewpoint of suppressing the influence of manufacturing errors during assembly of the zoom lens, that the C group has a cemented lens including one or more concave lenses and one or more convex lenses.

The intermediate group M1 may have an additional group which is a set of lenses. On the other hand, from the viewpoint of making the zoom lens compact, the intermediate group M1 may be configured to include only A group, B group, and C group.

The intermediate lens group M2 has positive refractive power as a whole. This configuration is preferable from the viewpoint of suppressing the height of light rays that passes through the lens arranged on the image surface side of the M2 group and making the product compact.

At least one lens included in the intermediate lens group M1 and in the lens group closer to the image surface side than the intermediate lens group M1 is an anti-vibration lens. This configuration is preferable from the viewpoint of making the anti-vibration lens compact. At least one lens included in either the intermediate lens group M1 or the intermediate lens group M2 may be an anti-vibration lens. This configuration is preferable from the viewpoint of making the anti-vibration lens compact. For example, it is more preferable, from the viewpoint of realizing more preferable optical performance, that C group includes the anti-vibration lens.

The anti-vibration lens may move in a direction intersecting the optical axis of the optical system of the zoom lens. The anti-vibration lens is typically arranged in a zoom lens in such a manner that the anti-vibration lens moves in a direction perpendicular to the optical axis in response to vibrations of the zoom lens.

In the present description, the "focal length of the zoom lens" refers to the focal length of an optical system including lenses between the lens closest to the object side and the lens closest to the image surface side. In the present description, the "focal length of the zoom lens at the wide angle end" refers to the focal length at the wide angle end during infinity focus. In the present description, the "focal length of the zoom lens at the telephoto end" refers to the focal length at the telephoto end during infinity focus. The zoom lens may or may not include additional optical elements outside the aforementioned scope, such as an image sensor cover glass or an infrared cut filter that blocks certain wavelengths of light. In the present description, the distance on the optical axis of the zoom lens from the object side lens surface of the lens closest to the object side to the image surface side is referred to as the "total length".

The rear group may have the lens group L closest to the image surface side. It is preferable, from the viewpoint of optimizing the zooming effect of each lens group, that the lens group L is a lens group having negative refractive power. Moreover, it is even more preferable, from the viewpoint of suppressing the height of passing light rays and fluctuations in lateral chromatic aberration during zooming, that the lens group L has at least one convex lens.

The zoom lens may have a lens group F adjacent to the image surface side of the intermediate lens group M2. It is preferable, from the viewpoint of making of the focusing mechanism using the converging action of intermediate lens group M1 and intermediate lens group M2 compact, that the zoom lens includes the lens group F. The lens group F may have negative refractive power as a whole from the viewpoint of reducing the thickness and making the focusing mechanism compact. The lens group F may include a single lens from the viewpoint of further enhancing the above-mentioned effects.

In the present description, a "single lens" refers to a lens (optical element) having one optical surface on the object side and one on the image surface side, and the single lens also includes a lens whose optical surfaces have been coated with various coatings such as anti-reflection coatings and protective coatings. The shape of the optical surface of the single lens is not particularly limited. For example, the shape of the optical surface of the single lens may be either a spherical lens or an aspherical lens. Furthermore, for example, the shape of the optical surface of the single lens may include a so-called composite aspherical lens in which an aspherical surface is formed on the surface of a spherical lens with a thin resin layer, and one of the surfaces may be flat. A method for manufacturing the single lens is not particularly limited. For example, the single lens may include various lenses manufactured by grinding, molding, injection molding, or the like. Furthermore, the material of the single lens is not particularly limited. For example, the single lens may be a glass lens made of glass material, or may be a resin lens made of a resin material.

The zoom lens may include other lens groups in addition to the above configuration. For example, a third lens group having negative refractive power may be arranged between the second lens group G2 and the intermediate lens group M1. This configuration is preferable from the viewpoint of suppressing the fluctuation of spherical aberration and field curvature during zooming.

Also, for example, a third lens group G3 having positive refractive power may be arranged between the lens group F and the lens group L. This configuration is preferable from the viewpoints of suppressing fluctuations in field curvature during zooming and making the lens group L compact. On the other hand, the zoom lens according to the present embodiment may be a zoom lens including only the first lens group, the second lens group, and the rear group. This configuration is preferable from the viewpoint of making the zoom lens compact.

(3) Aperture Diaphragm

The zoom lens may include an aperture diaphragm. The aperture diaphragm may be arranged on the object side of the intermediate lens group M1, adjacent to the intermediate lens group M1, or may be arranged inside the intermediate lens group M1.

1-2. Operation (1) Zooming

When zooming from the wide angle end to the telephoto end, or from the telephoto end to the wide angle end, a zoom lens changes the air interval between adjacent lens groups on the optical axis to zoom.

It is preferable that the second lens group moves from the image surface side to the object side when moving from the wide angle end to the telephoto end. The trajectory of movement of the second lens group is not limited. For example, the second lens group may first move to the image surface side, and then move to the object side. Also, for example, the second lens group may move slower initially and gradually faster. This movement pattern is preferable from the viewpoint of making the first lens group compact.

(2) Focusing

It is preferable that in the zoom lens, the lens group F moves during focusing. Since the height of light rays is reduced by the converging effect of the intermediate lens group M2, it is possible to reduce the diameter of the lens group F arranged on the image surface side of the intermediate lens group M2. For this reason, it is preferable, from the viewpoint of making the focus mechanism compact, to make the lens group F a lens group that moves during focusing.

1-3. Expressions

It is desirable for the zoom lens to employ the above-mentioned configuration and to satisfy at least one of the following expressions.

1-2-1. Expression (1)

$$-1000 < \beta m1w < 0.00 \quad (5)$$

here,

βm1w is Lateral magnification of the intermediate lens group M1 during infinity focus at the wide angle end.

Expression (1) defines the lateral magnification of the intermediate lens group M1 during infinity focus at the wide angle end of the optical system. Satisfying the range defined by expression (1) is preferable from the viewpoint of reducing the diameter of the lens group closer to the image side than the intermediate lens group M1, since divergent light incident on the intermediate lens group M1 can be converted into convergent light on the image surface side of the intermediate lens group M1.

When βm1w falls below the lower limit, the total length may become longer.

When βm1w exceeds the upper limit, the lateral magnification of the intermediate lens group M1 during infinity focus at the wide angle end is 0 or positive, the light on the image surface side of the intermediate lens group M1 remains divergent light, the diameter of the lens group closer to the image surface side than the intermediate lens group M1 becomes large, and it becomes difficult to make the product compact, and therefore, βm1w exceeding the upper limit is not preferable.

From the viewpoint of reducing the total length, βm1w is preferably greater than −100.00, more preferably greater than −50.00, more preferably greater than −10.00, even more preferably greater than −5.00, and particularly preferably greater than −4.00. From the viewpoint of making the intermediate lens group M1 compact, βm1w is preferably less than −0.50, more preferably less than −0.70, and even more preferably less than −1.00.

1-2-2. Expression (2)

$$-5.00 < mL/fw < -0.01 \quad (2)$$

here, mL is a movement distance of the lens group L during zooming from the wide angle end to the telephoto end, when the movement distance from the object side to the image surface side is positive, and fw is a focal length of the zoom lens at the wide angle end.

Expression (2) defines the ratio between the movement distance of the lens group L during zooming from the wide angle end to the telephoto end and the focal length of the zoom lens at the wide angle end. By satisfying the range defined by the expression (2), the lens group L exerts an effect of increasing zooming during zooming. Therefore, satisfying the expression (2) is preferable from the viewpoint of achieving high magnification while suppressing the movement distance of each lens group.

When mL/fw falls below the lower limit, the movement distance of the lens group L during zooming may become large. As a result, the total length of the zoom lens at the telephoto end becomes long, and therefore, mL/fw falling below the lower limit is undesirable from the viewpoint of the compactness of the product.

When mL/fw exceeds the upper limit, the lens group L moves toward the image surface side during zooming from the wide angle end to the telephoto end. As a result, the back focal length at the wide angle end becomes long, and therefore, mL/fw exceeding the upper limit is undesirable from the viewpoint of the compactness of the product.

From the viewpoint of shortening the length of the zoom lens, mL/fw is preferably greater than −4.00, and more preferably greater than −3.00. From the viewpoint of suppressing the movement distance of each lens group, mL/fw is preferably less than −0.50, and more preferably less than −0.70.

1-2-3. Expression (3)

$$0.20 < Lt/ft < 1.30 \quad (3)$$

here,

Lt is a total length of the zoom lens at the telephoto end, and ft is a focal length of the zoom lens at the telephoto end.

Expression (3) defines the ratio between a total length of the optical system and the focal length of the optical system at the telephoto end. Satisfying the range defined by expression (3) is preferable from the viewpoint of achieving both compactness of the product and excellent optical performance.

When Lt/ft falls below the lower limit, the total length of the optical system at the telephoto end may become shorter than the proper value. As a result, it becomes difficult to correct spherical aberration, coma aberration, and the like that occur on each lens surface, and it becomes difficult to realize a zoom lens having excellent optical performance, and therefore, Lt/ft falling below the lower limit is undesirable. The "proper value" of the total length of the optical system mainly refers to a numerical range that can achieve both excellent optical performance and compactness of the product.

When Lt/ft exceeds the upper limit, the total length of the optical system at the telephoto end may become longer than the proper value. As a result, it becomes difficult to make the product compact, and therefore, Lt/ft exceeding the upper limit is undesirable.

From the viewpoint of realizing excellent optical performance, Lt/ft is preferably larger than 0.30, and more preferably larger than 0.40. From the viewpoint of shortening the total length of the optical system, Lt/ft is preferably less than 1.00, more preferably less than 0.90, and even more preferably less than 0.80.

1-2-4. Expression (4)

$$0.10 < fC/fM1 < 9.50 \tag{4}$$

here, fC is a focal length of C group, and fM1 is a focal length of the intermediate lens group M1.

Expression (4) defines the ratio between the focal length of C group and the focal length of the intermediate lens group M1 in the optical system. By satisfying the range defined by expression (4), it is possible to maintain excellent aberration correction while increasing the refractive power of the intermediate lens group M1, and it is also possible to lower the incidence position of light rays incident on the lens group closer the image surface side than the intermediate lens group M1. Therefore, it is preferable to satisfy the expression (4) from the viewpoint of achieving both compactness of the product and excellent optical performance.

When fC/fM1 falls below the lower limit, the refractive power of C group may become stronger than the proper value, or the refractive power of the intermediate lens group M1 may become weaker than the proper value. As a result, the aberration correction of the intermediate lens group M1 does not perform properly, and it becomes difficult to realize a zoom lens having excellent optical performance, and therefore, fC/fM1 falling below the lower limit is undesirable. The "proper value" of the refractive power of C group and the "proper value" of the refractive power of the intermediate lens group M1 may be appropriately determined mainly from a range in which both excellent optical performance and compactness of the product can be achieved.

When fC/fM1 exceeds the upper limit, the refractive power of C group may become weaker than the proper value, or the refractive power of the intermediate lens group M1 may become stronger than the proper value. As a result, it becomes difficult to lower the incidence position of light rays incident on the lens group closer to the image surface side than the intermediate lens group M1, and therefore, fC/fM1 exceeding the upper limit is undesirable.

From the viewpoint of realizing excellent optical performance, fC/fM1 is preferably greater than 0.30, more preferably greater than 0.50, more preferably greater than 0.70, more preferably greater than 0.90, and even more preferably greater than 1.00.

From the viewpoint of realizing compactness of the product, fC/fM1 is preferably less than 9.00, more preferably less than 7.00, more preferably less than 5.00, more preferably less than 3.00, and even more preferably less than 2.00.

1-2-5. Expression (5)

$$0.10 < Lt/ft < 3.00 \tag{5}$$

Expression (5) defines the ratio between the total length of the optical system at the telephoto end and the focal length of the zoom lens at the telephoto end. Satisfying the range defined by the expression (5) is preferable from the viewpoint of achieving both compactness of the product and excellent optical performance.

When Lt/ft falls below the lower limit, the total length of the zoom lens at the telephoto end is shorter than the proper value. As a result, it becomes difficult to correct spherical aberration, coma aberration, and the like that occur on each lens surface, and it becomes difficult to realize a zoom lens having excellent optical performance, and therefore, Lt/ft falling below the lower limit is undesirable.

When Lt/ft exceeds the upper limit, the total length of the zoom lens at the telephoto end is longer than the proper value. As a result, it becomes difficult to make the product compact, and therefore, Lt/ft exceeding the upper limit is undesirable.

From the viewpoint of correcting spherical aberration, coma aberration, and the like, Lt/ft is preferably greater than 0.30, and more preferably greater than 0.40. From the viewpoint of shortening the total length of the zoom lens, Lt/ft is preferably less than 1.00, more preferably less than 0.90, and even more preferably less than 0.80.

1-2-6. Expression (6)

$$0.10 < fC/fM1 < 20.00 \tag{6}$$

Expression (6) defines the ratio between the focal length of C group and the focal length of the intermediate lens group M1 in the optical system. Satisfying the range defined by the expression (6) is preferable from the viewpoint of maintaining favorable aberration correction while increasing the refractive power of the intermediate lens group M1. In addition, satisfying the range defined by expression (6) makes it possible to lower the incidence position of light rays incident on the lens group that is closer to the image surface side than the intermediate lens group M1. Satisfying the range defined by expression (6) is preferable from the viewpoint of achieving both compactness of the product and excellent optical performance.

When fC/fM1 falls below the lower limit, the refractive power of C group may become stronger than the proper value, or the refractive power of the intermediate lens group M1 may become weaker than the proper value. As a result, the aberration correction in the intermediate lens group M1 deteriorates, and it becomes difficult to realize a zoom lens having excellent optical performance, and therefore, fC/fM1 falling below the lower limit is undesirable.

When fC/fM1 exceeds the upper limit, the refractive power of C group may become weaker than a proper value, or the refractive power of the intermediate lens group M1 may become stronger than a proper value. Therefore, the aberration correction in the intermediate lens group M1 does not satisfy the proper value, and it becomes difficult to realize a zoom lens having excellent optical performance, and therefore, fC/fM1 exceeding the upper limit is undesirable.

From the viewpoint of setting the aberration correction in the intermediate lens group M1 in the appropriate range, fC/fM1 is preferably greater than 0.30, more preferably greater than 0.50, more preferably greater than 0.70, even more preferably greater than 0.90, and particularly preferably greater than 1.00. From the viewpoint of realizing excellent optical performance, fC/fM1 is preferably less than 9.00, more preferably less than 7.00, more preferably less than 5.00, even more preferably less than 3.00, and particularly preferably less than 2.00.

1-2-7. Expression (7)

$$-1000 < \beta m1w < 0.00 \quad (7)$$

Expression (7) defines the lateral magnification of the intermediate lens group M1 during infinity focus at the wide angle end of the optical system. By satisfying the range defined by expression (7), divergent light incident on the intermediate lens group M1 becomes convergent light on the image surface side of the intermediate lens group M1. As a result, the diameter of the lens group closer to the image surface side than the intermediate lens group M1 can be reduced. Satisfying the range defined by expression (7) is preferable from the viewpoint of compactness of the product.

When βm1w exceeds the upper limit value, the lateral magnification of the intermediate lens group M1 during infinity focus at the wide angle end becomes 0 or positive, and the divergent light from the intermediate lens group M1 is emitted from the image surface side as it is. As a result, the diameter of the lens group closer to the image surface side than the intermediate lens group M1 is increased, and it becomes difficult to make the product compact, and therefore, βm1w exceeding the upper limit value is undesirable.

From the viewpoint of compactness of the product, βm1w is preferably greater than −100.00, more preferably greater than −50.00, more preferably greater than −10.00, more preferably greater than −5.00, and even more preferably greater than −4.00. From the viewpoint of compactness of the product, βm1w is preferably less than −0.50, more preferably less than −0.70, and even more preferably less than −1.00.

1-2-8. Expression (8)

$$-5.00 < \mathrm{mL}/fw < -0.01 \quad (8)$$

Expression (8) defines the ratio between the movement distance of the lens group L during zooming from the wide angle end to the telephoto end and the focal length of the zoom lens at the wide angle end. By satisfying the range defined by the expression (8), the lens group L exerts an effect of increasing zooming during zooming. This makes it possible to achieve a higher magnification while suppressing the movement distance of each lens group.

When mL/fw falls below the lower limit, the lens group L moves toward the image surface side during zooming from the wide angle end to the telephoto end. As a result, the back focus becomes longer, and therefore, mL/fw falling below the lower limit is undesirable from the viewpoint of the compactness of the product.

When mL/fw exceeds the upper limit, the L group moves toward the image side during zooming, and it becomes difficult to ensure the required back focus and difficult to make the product compact, and therefore, mL/fw exceeding the upper limit is undesirable.

From the viewpoint of shortening the length of the zoom lens, the lower limit of mL/fw is preferably −4.00, and more preferably −3.00. From the viewpoint of suppressing the movement distance of each lens group, the upper limit of mL/fw is preferably −0.50, and more preferably −0.70.

1-2-9. Expression (9)

$$0.10 < f1/fw < 10.00 \quad (9)$$

here, f1 is a focal length of the first lens group, and fw is a focal length of the zoom lens at the wide angle end.

Expression (9) defines the ratio between the focal length of the first lens group and the focal length of the zoom lens at the wide angle end in the optical system. Satisfying the range defined by expression (9) is preferable from the viewpoint of shortening the movement distance of the first lens group during zooming from the wide angle end to the telephoto end, suppressing the occurrence of spherical aberration and coma aberration in the first lens group, and achieving both compactness of the product and excellent optical performance.

When f1/fw falls below the lower limit, the refractive power of the first lens group may be stronger than the proper value. As a result, it becomes difficult to correct the spherical aberration and coma aberration that occur in the first lens group throughout the entire zoom lens system, and therefore, f1/fw falling below the lower limit is undesirable. The "proper value" of the refractive power of the first lens group may be determined appropriately mainly from a range in which both excellent optical performance and compactness of the product can be achieved.

When f1/fw exceeds the upper limit, the refractive power of the first lens group may be weaker than the proper value. As a result, the movement distance of the first lens group during zooming from the wide angle end to the telephoto end becomes greater than the proper value, and it becomes difficult to make the product compact, and therefore, f1/fw exceeding the upper limit is undesirable.

From the viewpoint of realizing excellent optical performance, f1/fw is preferably greater than 1.00, more preferably greater than 1.50, more preferably greater than 2.00, and even more preferably greater than 2.50. From the viewpoint of the compactness of the product, f1/fw is preferably less than 9.00, more preferably less than 8.00, more preferably less than 7.00, and even more preferably less than 6.00.

1-2-10. Expression (10)

$$0.90 < \beta m1t/\beta m1w < 10.00 \quad (10)$$

here,

βm1w is a lateral magnification of the intermediate lens group M1 during infinity focus at the wide angle end, and βm1t is a lateral magnification of the intermediate lens group M1 during infinity focus at the telephoto end.

Expression (10) defines the zooming ratio of the intermediate lens group M1 of the optical system. By satisfying the range defined by expression (10), the burden of zooming on the intermediate lens group M1 and the other lens groups during zooming from the wide angle end to the telephoto end can be optimized, and the movement distance of each lens group during zooming can be further suppressed. Therefore, satisfying the range defined by expression (10) is preferable from the viewpoint of suppressing fluctuations in optical performance during zooming of the zoom lens and achieving both compactness of the product and excellent optical performance.

When $\beta m1t/\beta m1w$ falls below the lower limit, the intermediate lens group M1 may act to reduce zooming, and the movement distance of the lens groups other than the intermediate lens group M1 may become greater than the proper value. As a result, it becomes difficult to make the product compact, and therefore, $\beta m1t/\beta m1w$ falling below the lower limit is undesirable. The "proper value" of the movement distance of the lens groups other than the intermediate lens group M1 may be appropriately determined mainly from a range in which both excellent optical performance and compactness of the product can be achieved.

When $\beta m1t/\beta m1w$ exceeds the upper limit, the zooming effect of the intermediate lens group M1 is likely to become greater than the proper value, and therefore the movement distance of the intermediate lens group M1 during zooming from the wide angle end to the telephoto end may become greater than the proper value, or the refractive power of the intermediate lens group M1 may become stronger than the proper value. As a result, it becomes difficult to achieve both compactness of the product and excellent optical performance, and therefore, $\beta m1t/\beta m1w$ exceeding the upper limit is undesirable. The "proper value" of the zooming effect of the intermediate lens group M1 may be appropriately determined mainly from a range in which both excellent optical performance and compactness of the product can be achieved.

From the viewpoint of the compactness of the product, $\beta m1t/\beta m1w$ is preferably greater than 1.00, more preferably greater than 1.50, and even more preferably greater than 1.80. From the viewpoint of achieving both compactness of the product and excellent optical performance, $\beta m1t/\beta m1w$ is preferably less than 8.00, more preferably less than 6.00, and even more preferably less than 5.00.

1-2-11. Expression (11)

$$0.50 < (1-\beta ct)\times\beta crt < 6.00 \tag{11}$$

here, $\beta ct$ is a lateral magnification of C group during infinity focus at the telephoto end, and $\beta crt$ is a composite lateral magnification of a lens group closer to an image surface side than the C group during infinity focus at the telephoto end.

Expression (11) defines the blur correction coefficient of C group at the telephoto end when C group includes an anti-vibration lens. Satisfying the range defined by expression (11) is preferable from the viewpoint of suppressing the movement distance of the anti-vibration lens during blur correction and the viewpoint of making the anti-vibration lens unit compact.

When $(1-\beta ct)\times\beta crt$ falls below the lower limit, the blur correction coefficient is smaller than the proper value, and the movement distance required during blur correction is greater than the proper value. As a result, it becomes difficult to make the anti-vibration mechanism compact, and therefore, $(1-\beta ct)\times\beta crt$ falling below the lower limit is undesirable.

When $(1-\beta ct)\times\beta crt$ exceeds the upper limit, this represents that the blur correction coefficient is greater than the proper value, and thus represents that the refractive power of the anti-vibration lens and the subsequent lens groups are stronger than the proper value, and it results in significant degradation of the optical performance during blur correction, and therefore, $(1-\beta ct)\times\beta crt$ exceeding the upper limit is undesirable. The "proper value" of the blur correction coefficient may be determined appropriately from a range that achieves both excellent optical performance and compactness of the anti-vibration lens unit during blur correction.

From the viewpoint of compactness of the anti-vibration mechanism, $(1-\beta ct)\times\beta crt$ is preferably greater than 0.70, more preferably greater than 0.80, more preferably greater than 0.90, and even more preferably greater than 1.00. From the viewpoint of realizing excellent optical performance, $(1-\beta ct)\times\beta crt$ is preferably less than 5.00, more preferably less than 4.50, more preferably less than 4.00, more preferably less than 3.50, more preferably less than 3.00, more preferably less than 2.80, and more preferably less than 2.60.

1-2-12. Expression (12)

$$1.40 < Ndp < 1.75 \tag{12}$$

here,

Ndp is a refractive index of the convex lens in C group with respect to line d.

Expression (12) defines the refractive index of the convex lens in C group of the optical system with respect to line d. Satisfying the range defined by expression (12) is preferable from the viewpoint of selecting glass having a light specific gravity. When C group having such a convex lens is used as an anti-vibration lens, it becomes possible to further lighten the anti-vibration lens. As a result, the anti-vibration mechanism can be made even more compact and lighter.

When Ndp falls below the lower limit, the refractive index of the convex lens in C group with respect to line d is lower than the proper value, and therefore in order to obtain the necessary refractive power of C group, it is necessary to increase the curvature radius. As a result, it becomes difficult to correct spherical aberration and coma aberration, and therefore, Ndp falling below the lower limit is undesirable.

When Ndp exceeds the upper limit, the refractive index of the convex lens in C group with respect to line d is higher than the proper value, and therefore glass with a high specific gravity is used. As a result, it becomes difficult to lighten the anti-vibration mechanism, and therefore, Ndp exceeding the upper limit is undesirable. The "proper value" of the refractive index of the convex lens in C group with respect to line d may be appropriately determined mainly from a range in which both excellent optical performance and lightweight of the anti-vibration lens unit can be achieved.

From the viewpoint of realizing excellent optical performance, Ndp is preferably greater than 1.45, and more preferably greater than 1.48. From the viewpoint of lightweight of the anti-vibration lens unit, Ndp is preferably less than 1.70, more preferably less than 1.65, more preferably less than 1.60, and even more preferably less than 1.55.

1-2-13. Expression (13)

$$50 < vdp < 100 \tag{13}$$

here, vdp is an Abbe constant of the convex lens in C group.

Expression (13) defines the Abbe constant of the convex lens in C group. Satisfying the range defined by expression (13) is preferable from the viewpoint of suppressing fluctuations in axial chromatic aberration during zooming and realizing excellent optical performance.

When vdp falls below the lower limit, the Abbe constant of the convex lens in C group becomes smaller than the proper value, and it becomes difficult to suppress fluctuations in axial chromatic aberration during zooming, and therefore, vdp falling below the lower limit is undesirable. The "proper value" of the Abbe constant of the convex lens in C group may be appropriately determined mainly from the range in which excellent optical performance can be achieved.

From the viewpoint of realizing excellent optical performance, vdp is preferably greater than 55.00, more preferably greater than 60.00, more preferably greater than 61.00, more preferably greater than 62.00, and even more preferably greater than 64.00. From the viewpoint of realizing excellent optical performance, vdp is preferably less than 95.00, more preferably less than 90.00, and even more preferably less than 85.00.

1-2-14. Expression (14)

$$-20.00 < fB/fM1 < -0.10 \tag{14}$$

here, fB is a focal length of B group, and fM1 is a focal length of the intermediate lens group M1.

Expression (14) defines the ratio of the focal length of B group to the focal length of the intermediate lens group M1. Satisfying the range defined by expression (14) is preferable from the viewpoint of simultaneously correcting spherical aberration and coma aberration that occur in the groups having positive refractive power in the intermediate lens group M1, i.e., A group and C group, and increasing the refractive power of the intermediate lens group M1. This is preferable from the viewpoint of achieving both compactness of the product and excellent optical performance.

When fB/fM1 falls below the lower limit, the refractive power of B group may be weaker than the proper value, or the refractive power of the intermediate lens group M1 may be stronger than the proper value. This causes insufficient correction of spherical aberration and coma aberration in the intermediate lens group M1, and therefore, fB/fM1 falling below the lower limit is undesirable from the viewpoint of obtaining excellent optical performance.

When fB/fM1 the upper limit, the exceeds refractive power of B group may become stronger than the proper value, or the refractive power of the intermediate lens group M1 may become weaker than the proper value. This causes overcorrection of spherical aberration and coma aberration in the intermediate lens group M1, and an increase in the movement distance of the intermediate lens group M1 during zooming variation. As a result, it becomes difficult to achieve both compactness of the product and excellent optical performance, and therefore, fB/fM1 exceeding the upper limit is undesirable. The "proper value" of the refractive power of B group may be appropriately determined mainly from a range in which both excellent optical performance and compactness of the product can be achieved.

From the viewpoint of realizing excellent optical performance, fB/fM1 is preferably greater than −10.00, more preferably greater than −5.00, more preferably greater than −4.50, more preferably greater than −4.00, and even more preferably greater than −3.50. From the viewpoint of realizing compactness of the product and excellent optical performance, fB/fM1 is preferably less than −0.20, more preferably less than −0.30, and even more preferably less than −0.40.

1-2-15. Expression (15)

$$1.70 < Ndn < 2.20 \tag{15}$$

here,

Ndn is a refractive index of the concave lens in B group with respect to the line d.

Expression (15) defines the refractive index of the concave lens in B group with respect to line d. Satisfying the range defined by expression (15) is preferable from the viewpoint of simultaneously correcting spherical aberration and field curvature that occur in the groups having positive refractive power in the intermediate lens group M1, i.e., A group and C group, and increasing the refractive power of the intermediate lens group M1. For this reason, it is preferable to satisfy the expression (15) from the viewpoint of achieving both compactness of the product and excellent optical performance.

When Ndn exceeds the upper limit, the spherical aberration and field curvature that occur in the groups having positive refractive power in the intermediate lens group M1, i.e., A group and C group, is overcorrected, and therefore, Ndn exceeding the upper limit is undesirable from the viewpoint of realizing excellent optical performance.

When Ndn falls below the lower limit, the spherical aberration and field curvature that occur in the groups having positive refractive power in the intermediate lens group M1, i.e., A group and C group, is not insufficiently corrected, and therefore, Ndn falling below the lower limit is undesirable from the viewpoint of realizing excellent optical performance.

From the viewpoint of realizing excellent optical performance, Ndn is preferably greater than 1.75, more preferably greater than 1.80, more preferably greater than 1.85, more preferably greater than 1.90, and even more preferably greater than 1.95. From the viewpoint of realizing excellent optical performance, Ndn is preferably less than 2.10, and more preferably less than 2.05.

1-2-16. Expression (16)

$$0.50 < Xm1/Xm2 < 2.00 \tag{16}$$

here,

Xm1 is a movement distance of the intermediate lens group M1 during zooming from the wide angle end to the telephoto end, and Xm2 is a movement distance of the intermediate lens group M2 during zooming from a wide angle end to a telephoto end.

Expression (16) defines the ratio of the movement distances of the intermediate lens group M1 and the intermediate lens group M2 during zooming. Satisfying the range defined by expression (16) is preferable from the viewpoint of realizing compactness of the product, since it allows the movement distances of the respective lens groups to be appropriately distributed.

When Xm1/Xm2 falls below the lower limit, the movement distance of the intermediate lens group M2 is greater than the proper value, and the change in the height of light rays during zooming is large. As a result, it becomes difficult to make the intermediate lens group M2 compact, and therefore, Xm1/Xm2 falling below the lower limit is undesirable. The "proper value" of the movement distance of the intermediate lens group M2 may be appropriately determined mainly from a range in which both excellent optical performance and compactness of the product can be achieved.

When Xm1/Xm2 exceeds the upper limit, the movement distance of the intermediate lens group M1 becomes greater than the proper value, and the change in the height of light rays during zooming becomes large. As a result, it becomes difficult to make the intermediate lens group M1 compact, and therefore, Xm1/Xm2 exceeding the upper limit is undesirable. The "proper value" of the movement distance of the intermediate lens group M1 may be appropriately determined mainly from a range in which both excellent optical performance and compactness of the product can be achieved.

From the viewpoint of the compactness of the product, Xm1/Xm2 is preferably greater than 0.60, and more preferably greater than 0.65. From the viewpoint of the compactness of the product, the upper limit of Xm1/Xm2 is preferably less than 1.80, more preferably less than 1.60, more preferably less than 1.40, and even more preferably less than 1.20.

1-2-17. Expression (17)

$$1.00 < \beta 2t/\beta 2w < 10.00 \tag{17}$$

here, $\beta 2w$ is a lateral magnification of the second lens group during infinity focus at the wide angle end, and $\beta 2t$ is a lateral magnification of the second lens group during infinity focus at the telephoto end.

Expression (17) defines the zooming ratio of the second lens group in the optical system. Satisfying the range defined by expression (17) is preferable from the viewpoint of realizing compactness of the product, since it allows the movement distances of the respective lens groups to be appropriately distributed.

When $\beta 2t/\beta 2w$ falls below the lower limit, the zooming ratio of the second lens group is smaller than the proper value, and therefore the movement distance other than the second lens group during zooming of the zoom lens may be greater than the proper value, or the refractive power of the second lens group may be weaker than the proper value. As a result, it becomes difficult to achieve both compactness of the product and excellent optical performance, and therefore, $\beta 2t/\beta 2w$ falling below the lower limit is undesirable.

When $\beta 2t/\beta 2w$ exceeds the upper limit, the zooming ratio of the second lens group is larger than the proper value, and therefore the movement distance of the second lens group during zooming of the zoom lens may be larger than the proper value, or the refractive power of the second lens group may be stronger than the proper value. As a result, it becomes difficult to achieve both compactness of the product and excellent optical performance, and therefore, $\beta 2t/\beta 2w$ exceeding the upper limit is undesirable. The "proper value" of the zooming ratio of the second lens group may be appropriately determined from a range in which both excellent optical performance and compactness of the product can be achieved. The "proper value" of the movement distance of the second lens group during zooming of the zoom lens may be appropriately determined mainly from a range in which both excellent optical performance and compactness of the product can be achieved. The "proper value" of the refractive power of the second lens group may be appropriately determined mainly from a range in which both excellent optical performance and compactness of the product can be achieved.

From the viewpoint of achieving both compactness of the product and excellent optical performance, $\beta 2t/\beta 2w$ is preferably greater than 2.00, more preferably greater than 3.00, and even more preferably greater than 4.00. From the viewpoint of achieving both compactness of the product and excellent optical performance, $\beta 2t/\beta 2w$ is preferably less than 9.50, more preferably less than 9.00, and even more preferably less than 8.50.

1-2-18. Expression (18)

$$1.10 < \beta Lt/\beta Lw < 3.00 \tag{18}$$

here, $\beta Lw$ is a lateral magnification of the lens group L during infinity focus at the wide angle end, and $\beta Lt$ is a lateral magnification of the lens group L during infinity focus at the telephoto end.

Expression (18) defines the zooming ratio of the lens group L of the optical system. Satisfying the range defined by expression (18) is preferable from the viewpoint of realizing compactness of the product, since it allows the movement distances of the respective lens groups to be more appropriately distributed.

When $\beta Lt/\beta Lw$ exceeds the upper limit, the zooming ratio of the lens group L is greater than the proper value, and therefore the movement distance of the lens group L during zooming of the zoom lens may be greater than the proper value, or the refractive power of the lens group L may be stronger than the proper value. As a result, it becomes difficult to achieve both compactness of the product and excellent optical performance, and therefore, $\beta Lt/\beta Lw$ exceeding the upper limit is undesirable.

When $\beta Lt/\beta Lw$ falls below the lower limit, the zooming ratio of lens group L is smaller than the proper value, and therefore the movement distance other than the lens group L during zooming of the zoom lens may be greater than the proper value, or the refractive power of the L group may be weaker than the proper value. As a result, it becomes difficult to achieve both compactness of the product and excellent optical performance, and therefore, $\beta Lt/\beta LW$ falling below the lower limit is undesirable.

From the viewpoint of achieving both compactness of the product and excellent optical performance, $\beta Lt/\beta Lw$ is preferably greater than 1.10, more preferably greater than 1.20, more preferably greater than 1.30, and even more preferably greater than 1.40. From the viewpoint of achieving both compactness of the product and excellent optical performance, $\beta Lt/\beta Lw$ is preferably less than 2.80, more preferably less than 2.60, more preferably less than 2.40, more preferably less than 2.20, and even more preferably less than 2.00.

1-2-19. Expression (19)

It is preferable that when all the lenses closer to the image surface side than the intermediate lens group M2 are defined as R group, the following expression (19) is satisfied:

$$1.50 < \beta Rt/\beta Rw < 5.00 \tag{19}$$

here, $\beta Rw$ is a lateral magnification of R group during infinity focus at the wide angle end, and $\beta Rt$ is a lateral magnification of R group during infinity focus at the telephoto end.

Expression (19) defines the zooming ratio of R group in the optical system. Satisfying the range defined by expression (19) is preferable from the viewpoint of realizing compactness of the product, since it allows the movement distances of the respective lens groups to be appropriately distributed.

When $\beta Rt/\beta Rw$ falls below the lower limit, the zooming ratio of R group may be smaller than the proper value, the movement distance of the lens groups other than R group during zooming of the zoom lens may be greater than the proper value, or the refractive power of R group may be weaker than the proper value. As a result, it becomes difficult to achieve both compactness of the product and excellent optical performance, and therefore, $\beta Rt/\beta Rw$ falling below the lower limit is undesirable.

When $\beta Rt/\beta Rw$ exceeds the upper limit, the zooming ratio of R group may be larger than the proper value, the movement distance of the lens group included in R group during zooming of the zoom lens may be longer than the proper value, or the refractive power of R group may be stronger than the proper value. As a result, it becomes difficult to achieve both compactness of the product and excellent optical performance, and therefore, $\beta Rt/\beta Rw$ exceeding the upper limit is undesirable.

From the viewpoint of achieving both compactness of the product and excellent optical performance, $\beta Rt/\beta Rw$ is preferably greater than 1.10, more preferably greater than 1.20, more preferably greater than 1.30, and even more preferably greater than 1.40. From the viewpoint of achieving both compactness of the product and excellent optical performance, $\beta Rt/\beta Rw$ is preferably less than 4.50, more preferably less than 4.00, more preferably less than 3.50, more preferably less than 3.00, and even more preferably less than 2.50.

1-2-20. Expression (20)

$$-20.00 < (1-\beta ft)^2 \times \beta frt^2 < -1.00 \quad (20)$$

here, $\beta ft$ is a lateral magnification of the lens group F during infinity focus at the telephoto end, and $\beta frt$ is a composite lateral magnification of the lens group closer to the image surface side than the lens group F during infinity focus at the telephoto end.

Expression (20) defines the play magnification of the lens group F at the telephoto end (the ratio of the amount of movement of the image surface to the unit amount of movement of the lens group F). Satisfying the range defined by expression (20) is preferable from the viewpoint of achieving both compactness of a focusing mechanism and excellent optical performance, since the movement distance of the lens group F is suppressed to a more appropriate range during focusing on a close object.

When $(1-\beta ft)^2 \times \beta frt^2$ falls below the lower limit, the play magnification of the lens group F may become smaller than the proper value. As a result, it may become necessary to make the refractive power of the lens group F or the lens group on the image surface side thereof stronger than the proper value, and therefore, $(1-\beta ft)^2 \times \beta frt^2$ falling below the lower limit is undesirable from the viewpoint of suppressing focusing fluctuations during focusing on a close object. The "proper value" of the play magnification of the lens group F may be appropriately determined mainly from a range in which both excellent optical performance and compactness of the product can be achieved. The "proper value" of the refractive power of the lens group F or the lens group on the image surface side thereof may be appropriately determined from a range in which both excellent optical performance and compactness of the product can be achieved.

When $(1-\beta ft)^2 \times \beta frt^2$ exceeds the upper limit, the play magnification of lens group F may become larger than the proper value, and as a result, the movement distance of the lens group F during focusing on a close object may become larger than the proper value, and therefore, $(1-\beta ft)^2 \times \beta frt^2$ exceeding the upper limit is undesirable. The "proper value" of the movement distance of the lens group F may be appropriately determined mainly from a range in which both excellent optical performance and compactness of the product can be achieved.

From the viewpoint of more suitably suppressing focusing fluctuations, $(1-\beta ft)^2 \times \beta frt^2$ is preferably greater than −18.00, more preferably greater than −16.00, more preferably greater than −14.00, and even more preferably greater than −12.00. From the viewpoint of shortening the movement distance of the lens group F during focusing, $(1-\beta ft)^2 \times \beta frt^2$ is preferably less than −2.00, more preferably less than −3.00, more preferably less than −4.00, more preferably less than −5.00, more preferably less than −6.00, more preferably less than −7.00, more preferably less than −8.00, and even more preferably less than −9.00.

2. Imaging Device

Next, an imaging device according to one embodiment of the present invention is described. The imaging device includes the zoom lens according to the present embodiment described above, and an image sensor provided on the image surface side of the zoom lens for converting an optical image formed by the zoom lens into an electrical signal.

Here, there is no limitation on the image sensor, and the image sensor can be a solid-state image sensor such as a CCD (Charge Coupled Device) sensor or a CMOS (Complementary Metal Oxide Semiconductor) sensor, or it can also be a silver halide film, an infrared cut filter (IRCF), etc. The imaging device according to the present embodiment is suitable for use as an imaging device using the above-mentioned solid-state image sensor, such as a digital camera or video camera. The imaging device may be a lens fixed type imaging device in which a lens is fixed to a housing, or may be a lens interchangeable type imaging device such as a single lens reflex camera or a mirrorless camera. In particular, the zoom lens according to the present embodiment can ensure a back focus suitable for an interchangeable lens system. Therefore, the present invention is suitable for use in imaging devices such as single lens reflex cameras that are equipped with an optical finder, a phase difference sensor, and a reflex mirror for splitting light thereto.

Figure 13:
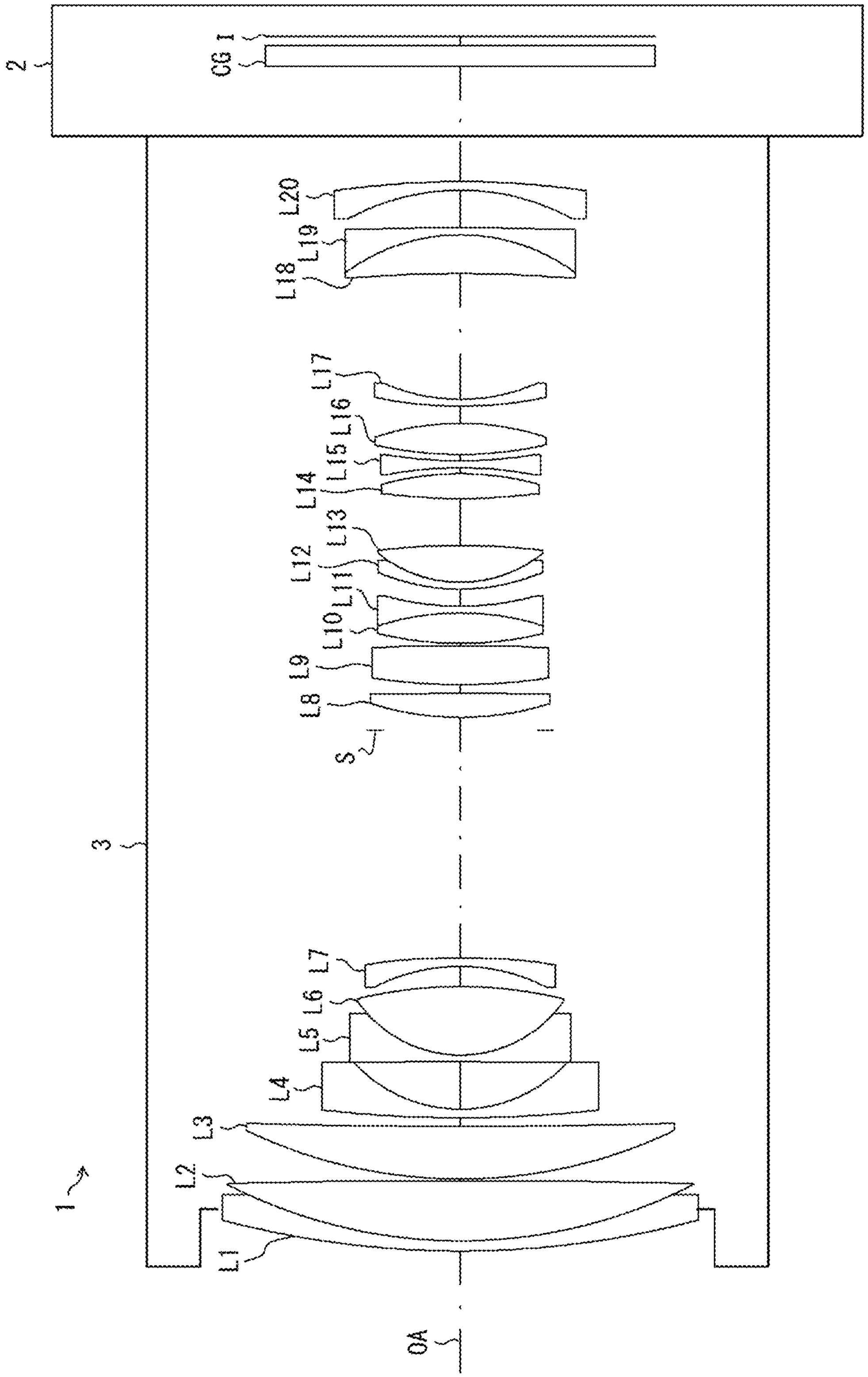
FIG. 13 is a diagram schematically illustrating an example of a configuration of an imaging device according to one embodiment of the present invention.

FIG. 13 is a diagram illustrating an example of the configuration of an imaging device according to the present embodiment. As illustrated in FIG. 13, the mirrorless camera 1 has a body 2 and a lens barrel 3 that is detachable from the body 2. The mirrorless camera 1 is one aspect of the imaging device.

The lens barrel 3 has a zoom lens. The zoom lens 30 includes lenses L1 to L20. The zoom lens is configured to satisfy, for example, the above-mentioned expressions (1) and (2), or expressions (3) and (4). In addition, a diaphragm S is arranged on the object side of the lens L8.

The lens group including lenses L1 to L3 has positive refractive power as a whole and corresponds to the above-mentioned first lens group. The lens group including lenses L4 to L7 has negative refractive power as a whole and corresponds to the above-mentioned second lens group. The lens group including the lenses L8 to L13 has positive refractive power as a whole, and corresponds to the above-mentioned intermediate lens group M1. Furthermore, the lenses L8 and L9 correspond to the above-mentioned A group, the lenses L10 and L11 correspond to the above-mentioned B group, and the lenses L12 and L13 correspond to the above-mentioned C group. The lens group including the lenses L14 to L16 has positive refractive power as a whole, and corresponds to the above-mentioned intermediate lens group M2. The lens group including the lens L17 has negative refractive power as a whole and corresponds to the above-mentioned lens group F. The lens group including the lenses L18 to L20 has negative refractive power as a whole and corresponds to the above-mentioned lens group L.

The main body 2 has a CCD sensor I as an image sensor and a cover glass CG. The CCD sensor I is arranged in the main body 2 at a position where the optical axis OA of the zoom lens in the lens barrel 3 attached to the main body 2 is the central axis. The main body 2 may have a parallel plane plate having no substantial refractive power, such as an infrared cut filter (IRCF), instead of the cover glass CG.

The mirrorless camera 1 includes a zoom lens, making it possible to achieve both high optical performance and compactness of the product.

The present invention is not limited to the above-described embodiments, and various modifications are possible within the scope of the claims. The technical scope of the present invention also includes embodiments obtained by appropriately combining the technical means disclosed in the different embodiments.

SUMMARY

A zoom lens according to a first aspect of the present invention is a zoom lens having a plurality of lens groups, the zoom lens including, in order from an object side: a first lens group having positive refractive power; a second lens group having negative refractive power; and a rear group being a set of lens groups and having positive refractive power as a whole, wherein the rear group includes, in order from an object side, an intermediate lens group M1 having positive refractive power, and an intermediate lens group M2 having positive refractive power, an interval between adjacent lens groups is changed during zooming from a wide angle end to a telephoto end, the intermediate lens group M1 includes, in order from the object side, an A group being a set of lenses and having positive refractive power, a B group being a set of lenses and having negative refractive power, and a C group being a set of lenses and having positive refractive power, and the zoom lens further satisfies either a condition A or a condition B below, The condition A is that at least one lens included in either the intermediate lens group M1 or the intermediate lens group M2 is an anti-vibration lens that moves in a direction intersecting an optical axis of the zoom lens (e.g., a direction perpendicular to the optical axis), and when a lens group closest to an image surface side in the rear group is defined as a lens group L, following expressions (1) and (2) are satisfied, $$-1000 < \beta m1w < 0.00 \tag{1}$$

$$-5.00 < mL/fw < -0.01 \tag{2}$$

here,

βm1w is a lateral magnification of the intermediate lens group M1 during infinity focus at a wide angle end, mL is a movement distance of the lens group L during zooming from a wide angle end to a telephoto end when a movement distance from an object side to an image surface side is considered positive, and fw is a focal length of the zoom lens at a wide angle end;

the condition B is that at least one lens included in the intermediate lens group M1 and in a lens group closer to an image surface side than the intermediate lens group M1 is an anti-vibration lens that moves in a direction intersecting an optical axis of the zoom lens, and following expressions (3) and (4) are satisfied, $$0.20 < Lt/ft < 1.30 \tag{3}$$

$$0.10 < fC/fM1 < 9.50 \tag{4}$$

here,

Lt is a total length of the zoom lens at a telephoto end, ft is a focal length of the zoom lens at a telephoto end, fC is a focal length of the C group, and fM1 is a focal length of the intermediate lens group M1.

A zoom lens according to a second aspect of the invention further satisfies the following formula (5) in the condition A of the first aspect:

$$0.10 < Lt/ft < 3.00 \tag{5}$$

here,

Lt is a total length of the zoom lens at the telephoto end, and ft is a focal length of the zoom lens at the telephoto end.

A zoom lens according to a third aspect of the present invention further satisfies the following expression (6) in the condition A of the first aspect or the second aspect:

$$0.10 < fC/fM1 < 20.00 \tag{6}$$

here, fC is a focal length of C group, and fM1 is a focal length of the intermediate lens group M1.

A zoom lens according to a fourth aspect of the present invention further satisfies the following expression (7) in the condition B of the first aspect:

$$-1000 < \beta m1w < 0.00 \tag{7}$$

here,

βm1w is a lateral magnification of the intermediate lens group M1 during infinity focus at the wide angle end.

A zoom lens according to a fifth aspect of the present invention satisfies the following expression (8), when a lens group closest to the image surface side is the lens group L, in the condition B of the first aspect or fourth aspect:

$$-5.00 < mL/fw < -0.01 \tag{8}$$

here, mL is movement distance of the lens group L during zooming from the wide angle end to the telephoto end, when the movement distance from the object side to the image surface side is positive, and fw is a focal length of the zoom lens at the wide angle end.

A zoom lens according to a sixth aspect of the present invention satisfies the following expression (9) in any one of the first aspect to the fifth aspect:

$$0.10 < f1/fw < 10.00 \tag{9}$$

here, f1 is a focal length of the first lens group, and fw is a focal length of the zoom lens at the wide angle end.

A zoom lens according to a seventh aspect of the present invention satisfies the following expression (10) in any one of the first aspect to the sixth aspect:

$$0.90 < \beta m1t/\beta m1w < 10.00 \tag{10}$$

here,

βm1w is a lateral magnification of the intermediate lens group M1 during infinity focus at the wide angle end, and βm1t is a lateral magnification of the intermediate lens group M1 during infinity focus at the telephoto end.

In a zoom lens according to an eighth aspect of the present invention, C group is an anti-vibration lens in any one of the first aspect to the seventh aspect.

A zoom lens according to a ninth aspect of the present invention satisfies the following expression (11) in the eighth aspect:

$$0.50 < (1-\beta ct)\times\beta crt < 6.00 \tag{11}$$

here,

βct is a lateral magnification of C group during infinity focus at the telephoto end, and βcrt is a composite lateral magnification of a lens group closer to an image surface side than the C group during infinity focus at the telephoto end.

In a zoom lens according to a tenth aspect of the present invention, C group has a convex lens and the following expression (12) is satisfied in the eighth aspect or the ninth aspect:

$$1.40 < Ndp < 1.75 \tag{12}$$

here,

Ndp is a refractive index of the convex lens in C group with respect to line d.

In a zoom lens according to an eleventh aspect of the present invention, C group has a convex lens and the following expression (13) is satisfied in any one of the first aspect to the tenth aspect:

$$50 < vdp < 100 \tag{13}$$

here, vdp is an Abbe constant of the convex lens in C group.

In a zoom lens according to a twelfth aspect of the present invention, C group has a concave lens in any one of the first aspect to the eleventh aspect.

In a zoom lens according to a thirteenth aspect of the present invention, B group has a convex lens in any one of the first aspect to the twelfth aspect.

A zoom lens according to a fourteenth aspect of the present invention satisfies the following expression (14) in any one of the first aspect to the thirteenth aspect:

$$-20.00 < fB/fM1 < -0.10 \tag{14}$$

here, fB is a focal length of B group, and fM1 is a focal length of the intermediate lens group M1.

In a zoom lens according to a fifth aspect of the present invention, B group has a concave lens and the following expression (15) satisfied in any one of the first aspect to the fourteenth aspect:

$$1.70 < Ndn < 2.20 \tag{15}$$

here,

Ndn is a refractive index of the concave lens in B group with respect to line d.

A zoom lens according to a sixteenth aspect of the present invention satisfies the following expression (16) in any one of the first aspect to the fifth aspect:

$$0.50 < Xm1/Xm2 < 2.00 \tag{16}$$

here,

Xm1 is a movement distance of the intermediate lens group M1 during zooming from the wide angle end to the telephoto end, and Xm2 is a movement distance of the intermediate lens group M2 during zooming from a wide angle end to a telephoto end.

A zoom lens according to a seventeenth aspect of the present invention satisfies the following expression (17) in any one of the first aspect to the sixteenth aspect:

$$1.00 < \beta 2t/\beta 2w < 10.00 \tag{17}$$

here,

β2w is a lateral magnification of the second lens group during infinity focus at the wide angle end, and β2t is a lateral magnification of the second lens group during infinity focus at the telephoto end.

A zoom lens according to an eighteenth aspect of the present invention satisfies the following expression (18), when a lens group closest to the image surface side is the lens group L, in any one of the first aspect to the seventeenth aspect:

$$1.10 < \beta Lt/\beta Lw < 3.00 \tag{18}$$

here,

βLw is a lateral magnification of the lens group L during infinity focus at the wide angle end, and βLt is a lateral magnification of the lens group L during infinity focus at the telephoto end.

A zoom lens according to a nineteenth aspect of the present invention satisfies the following expression (19), when all of the lenses closer to the image surface side than the intermediate lens group M2 are defined as R group, in any one of the first aspect to the eighteenth aspect:

$$1.50 < \beta Rt/\beta Rw < 5.00 \tag{19}$$

here,

βRw is a lateral magnification of R group during infinity focus at the wide angle end, and βRt is a lateral magnification of R group during infinity focus at the telephoto end.

In a zoom lens according to a twentieth aspect of the present invention, focusing is achieved by moving the lens group F, when a lens group adjacent to the image surface side of the intermediate lens group M2 is the lens group F, in any one of the first aspect to the nineteenth aspect.

In a zoom lens according to a twenty-first aspect of the present invention, the lens group F has negative refractive power as a whole in the twentieth aspect.

A zoom lens according to a twenty-second aspect of the present invention satisfies the following expression (20) in the twentieth aspect or the twenty-first aspect:

$$-20.00 < (1-\beta ft)^2 \times \beta frt^2 < -1.00 \tag{20}$$

here,

βft is a lateral magnification of F group during infinity focus at the telephoto end, and βfrt is a composite lateral magnification of the lens group closer to the image surface side than F group during infinity focus at the telephoto end.

In a zoom lens according to a twenty-third aspect of the present invention, the lens group F has a single lens in any one of the twenty-second aspect to the twenty-second aspect.

An imaging device according to a twenty-fourth aspect of the present invention is an imaging device including: the zoom lens according to any one of the first aspect to the twenty-third aspect; and an image sensor that is on the image surface side of the zoom lens and converts an optical image formed by the zoom lens into an electrical signal.

The present invention is not limited to the above-described embodiments, and various modifications are possible within the scope of the claims. The technical scope of the present invention also includes embodiments obtained by appropriately combining the technical means disclosed in the different embodiments.

EXAMPLES

One example of the present invention is described. In the following tables, unless otherwise specified, all length units are "mm", all angle of view units are "0", and "E+a" represents "$\times 10^{a}$".

Example 1

(1) Optical System Configuration

FIG. 1 is a diagram illustrating an optical configuration of a zoom lens according to Example 1 at a telephoto end. The zoom lens of Example 1 includes, in order from the object side, a first lens group G1 having positive refractive power, a second lens group G2 having negative refractive power, an intermediate lens group M1 having positive refractive power, an intermediate lens group M2 having positive refractive power, a lens group F having negative refractive power, and a lens group L having negative refractive power. The intermediate lens group M1 includes, in order from the object side, A group having positive refractive power, B group having negative refractive power, and C group having positive refractive power. The intermediate lens group M1, the intermediate lens group M2, the lens group F, and the lens group L correspond to the above-mentioned rear group. The lens group F and the lens group L correspond to the above-mentioned R group.

The zoom lens focuses from an object at infinity to a close object by moving the lens group F toward the object side.

In Example 1, the zoom lens zooms by changing the air interval between adjacent lens groups on the optical axis. The same applies to the following examples.

The arrows in FIG. 1 indicate the direction and manner in which each lens group moves during zooming from the wide angle end to the telephoto end. As illustrated in FIG. 1, during zooming from the wide angle end to the telephoto end, the first lens group G1 gradually moves toward the object side, the second lens group G2 either does not move at first or moves toward the image surface side and then moves toward the object side, the intermediate lens group M1 gradually moves toward the object side, the intermediate lens group M2 gradually moves toward the object side, the lens group F moves toward the object side slowly at first and faster later, and the lens group L gradually moves toward the object side.

The aperture diaphragm S is arranged adjacent to the object side of the intermediate lens group M1. Moreover, "I" illustrated in FIG. 1 is an image surface side, which is, for example, the imaging plane of a solid-state image sensor such as a CCD sensor or a CMOS sensor, or the film plane of a silver halide film. Between the lens group L and the CCD sensor I, a cover glass CG is arranged. These points are similar to those in the drawings that schematically illustrate the optical configurations of other examples, and therefore are not described below.

The configuration of each lens group is described below. The first lens group G1 includes, in order from the object side, a cemented lens of a negative meniscus lens L1 with a convex surface facing the object side and a biconvex lens L2, and a positive meniscus lens L3 with a convex surface facing the object side.

The second lens group G2 includes, in order from the object side, a fourth lens L4 having a negative meniscus shape with a convex surface facing the object side, a cemented lens of a fifth lens L5 which is a biconcave lens and a sixth lens L6 which is a biconvex lens, and a seventh lens L7 having a negative meniscus shape with a concave surface facing the object side. Noted that a negative meniscus lens is a lens having negative refractive power, and a positive meniscus lens is a lens having positive refractive power.

The intermediate lens group M1 includes, in order from the object side, an eighth lens L8 which is a biconvex lens, a ninth lens L9 which is a biconvex lens, a cemented lens of a tenth lens L10 which is a biconvex lens and an eleventh lens L11 which is a biconcave lens, and a cemented lens of a twelfth lens L12 which has a negative meniscus shape with a convex surface facing the object side and a thirteenth lens L13 which is a biconvex lens.

The intermediate lens group M2 includes, in order from the object side, a fourteenth lens L14 which is a biconvex lens, a fifteenth lens L15 which is a biconcave lens, and a sixteenth lens L16 which is a biconvex lens.

The lens group F includes a seventeenth lens L17 having a positive meniscus shape with a convex surface facing the object side.

The lens group L includes, in order from the object side, a cemented lens of an eighteenth lens L18 having a positive meniscus shape with a concave surface facing the object side and a nineteenth lens L19 having a negative meniscus shape with a concave surface facing the object side, and a twentieth lens L20 having a negative meniscus shape with a concave surface facing the object side.

(2) Numerical Examples

Next, numerical examples to which specific numerical values of the zoom lens are applied are described. Table 1 illustrates the surface data of the zoom lens.

In the surface data table in the examples of the present invention, "No." represents the order of the lens surface counted from the object side, "R" represents the curvature radius of the lens surface, "D" represents the interval between the lens surfaces on the optical axis, "Nd" represents the refractive index with respect to line d (wavelength λ=587.56 nm), and "νd" represents the Abbe constant with respect to line d (wavelength λ=587.56 nm). In addition, "STOP" indicated in the column next to the surface number represents the aperture diaphragm S. Furthermore, "ASPH" indicated in the column next to the surface number represents that the lens surface is aspheric, and in this case, the column for the curvature radius R represents the paraxial curvature radius. Furthermore, the term "variable" in the "D" column refers that the interval between the lens surfaces on the optical axis is a variable interval that changes during zooming.

In Table 1, No. 1 to 5 are surface numbers of the first lens group G1. No. 6 to 12 are surface numbers of the second lens group G2. No. 13 is a surface number of the aperture diaphragm S. No. 14 to 23 are surface numbers of the intermediate lens group M1. No. 24 to 29 are surface numbers of the intermediate lens group M2. No. 30 to 31 are surface numbers of the lens group F. No. 32 to No. 36 are surface numbers of the lens group L. No. 37 and No. 38 are surface numbers of the cover glass.

TABLE 1

| Surface data No. | | R | D | Nd | Vd |
|---|---|---|---|---|---|
| 1 | | 108.356 | 1.200 | 1.870700 | 40.730 |
| 2 | | 59.577 | 7.014 | 1.437000 | 95.100 |
| 3 | | −1123.684 | 0.200 | | |
| 4 | | 57.808 | 6.162 | 1.497000 | 81.610 |
| 5 | | 860.818 | Variable | | |
| 6 | | 143.279 | 1.000 | 1.870700 | 40.730 |
| 7 | | 16.910 | 5.527 | | |
| 8 | | −1188.523 | 0.810 | 1.744000 | 44.720 |
| 9 | | 14.619 | 8.006 | 1.770470 | 29.740 |
| 10 | | −51.218 | 2.345 | | |
| 11 | ASPH | −22.579 | 1.000 | 1.618810 | 63.850 |
| 12 | ASPH | −120.804 | Variable | | |
| 13 | STOP | INF | 1.500 | | |
| 14 | | 34.319 | 2.816 | 1.854510 | 25.150 |
| 15 | | −818.123 | 1.011 | | |
| 16 | | 66.784 | 4.561 | 1.516800 | 64.200 |
| 17 | | −220.158 | 0.254 | | |
| 18 | | 39.827 | 3.571 | 1.497000 | 81.610 |
| 19 | | −31.396 | 0.800 | 2.001000 | 29.130 |
| 20 | | 33.554 | 1.987 | | |
| 21 | | 24.476 | 0.800 | 1.834810 | 42.720 |
| 22 | | 15.315 | 4.300 | 1.516330 | 64.060 |
| 23 | ASPH | −78.619 | Variable | | |
| 24 | ASPH | 58.886 | 2.929 | 1.618810 | 63.850 |
| 25 | ASPH | −33.653 | 0.700 | | |
| 26 | | −45.908 | 0.800 | 2.001000 | 29.130 |
| 27 | | 53.654 | 0.744 | | |
| 28 | | 45.214 | 3.637 | 1.720470 | 34.710 |
| 29 | | −31.465 | Variable | | |
| 30 | | 48.763 | 0.800 | 1.755000 | 52.320 |
| 31 | | 22.441 | Variable | | |
| 32 | | −151.448 | 4.524 | 1.854510 | 25.150 |
| 33 | | −22.480 | 0.800 | 1.729160 | 54.670 |
| 34 | | −430.647 | 4.404 | | |
| 35 | | −27.393 | 1.000 | 1.729160 | 54.670 |
| 36 | | −103.271 | Variable | | |
| 37 | | INF | 2.500 | 1.516800 | 64.200 |
| 38 | | INF | 1.000 | | |

Table 2 illustrates the specifications of the zoom lens of Example 1. In the table of specifications, "f" represents the focal length of the zoom lens, "Fno" represents the F-number, "ω" represents the half angle of view, and notations such as "D (5)" represent the interval that changes among the lens intervals.

TABLE 2

| | Wide angle | Intermediate | Telephoto |
|---|---|---|---|
| f | 28.826 | 91.616 | 291.040 |
| Fno | 3.956 | 6.481 | 7.300 |
| ω | 38.281 | 12.679 | 4.056 |
| D(5) | 1.000 | 26.471 | 64.763 |
| D(12) | 26.604 | 7.182 | 1.500 |
| D(23) | 5.465 | 3.155 | 3.682 |
| D(29) | 2.007 | 9.382 | 2.011 |
| D(31) | 14.707 | 7.333 | 14.704 |
| D(36) | 13.480 | 39.911 | 51.627 |

Table 3 illustrates aspheric coefficients of the aspheric surface in the zoom lens of Example 1. The aspheric coefficients in the table are values when each aspheric shape is defined by the following expression (I).

[Formula 1]

$$X(Y) = \frac{CY^2}{1+\sqrt{1-(1+k)CY^2}} + A_4Y^4 + A_6Y^6 + A_8Y^8A_{10}Y^{10} + A_{12}Y^{12} \quad (1)$$

In the above expressions, "X (Y)" is a function that represents the amount of displacement of the aspheric surface in the optical axis direction from a reference plane perpendicular to the optical axis, "C" is the curvature at the surface vertex, "Y" is the height (distance) from the optical axis to the aspheric surface in a direction perpendicular to the optical axis, "k" is the conic constant (Conic coefficient), and "An" (n is an integer) is the n-th order aspheric coefficient.

TABLE 3

Aspheric surface data

| No. | K | A4 | A6 |
|---|---|---|---|
| 11 | 0.00 | −1.912570E−05 | 3.574780E−07 |
| 12 | 0.00 | −3.386900E−05 | 3.166070E−07 |
| 23 | 0.00 | 3.581830E−06 | 5.311830E−09 |
| 24 | 0.00 | −1.251230E−05 | −7.995040E−08 |
| 25 | 0.00 | 6.779470E−06 | −9.976160E−08 |

| No. | A8 | A10 | A12 |
|---|---|---|---|
| 11 | −4.507780E−09 | 3.038130E−11 | −8.606390E−14 |
| 12 | −3.774900E−09 | 2.348260E−11 | −5.995090E−14 |
| 23 | −4.028280E−10 | −7.314920E−13 | 1.788380E−14 |
| 24 | 1.392650E−09 | −1.761440E−11 | 1.582530E−14 |
| 25 | 1.672330E−09 | −1.935610E−11 | 1.865960E−14 |

Figure 2:
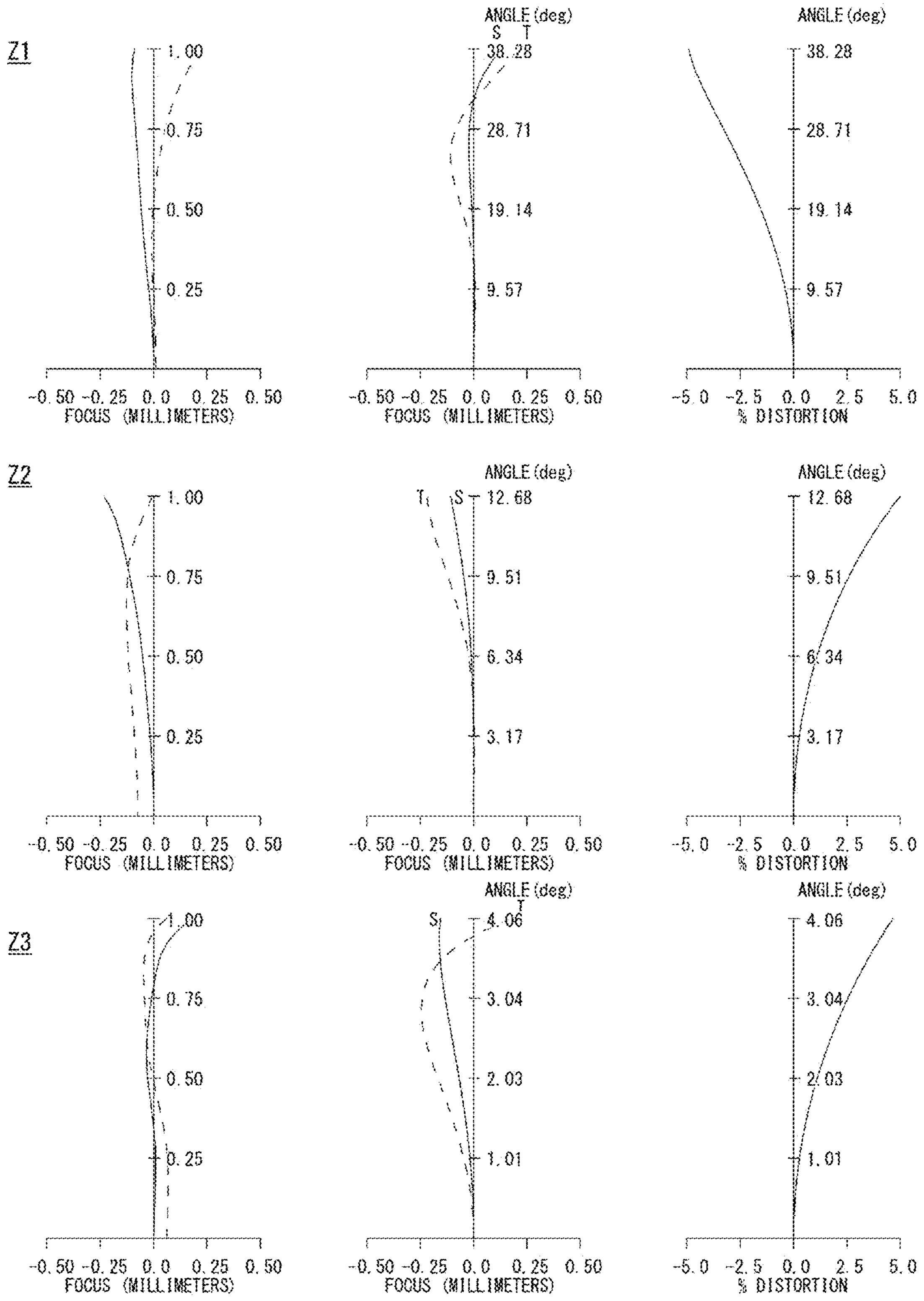
FIG. 2 illustrates spherical aberration diagrams, astigmatism diagrams, and distortion aberration diagrams of the optical system according to Example 1, where Z1 represents a longitudinal aberration diagram at the wide angle end, Z2 represents a longitudinal aberration diagram at the intermediate position, and Z3 represents a longitudinal aberration diagram at the telephoto end.

FIG. 2 illustrates longitudinal aberration diagrams at INF focus of the optical system during zooming from the wide angle end to the telephoto end. Each longitudinal aberration diagram represents, in order from the left, spherical aberration, astigmatism, and distortion aberration. Moreover, Z1 represents a longitudinal aberration diagram at the wide angle end, Z2 represents a longitudinal aberration diagram at the intermediate position, and Z3 represents a longitudinal aberration diagram at the telephoto end.

In the diagram illustrating spherical aberration, the vertical axis represents the ratio of the light ray height to the entrance pupil, and the horizontal axis represents defocus. In the diagram illustrating spherical aberration, the solid line represents the line d (587.6 nm) and the dashed line represents the line g (435.8 nm).

In the diagram illustrating astigmatism, the vertical axis represents the angle of view, and the horizontal axis represents the defocus. In the diagrams illustrating astigmatism, the solid line represents the sagittal direction S of the line d, and the dashed line represents the meridional direction T of the line d.

In the diagram illustrating distortion aberration, the vertical axis represents the angle of view, and the horizontal axis r %. In the diagrams illustrating distortion aberration, the solid line represents distortion aberration at the line d. The order and arrangement of displaying these aberrations, and what is indicated by the solid line, the wavy line, and the like in each drawing are similar in Examples 2 to 6, and thus the description thereof will be omitted below.

Example 2

(1) Optical System Configuration

Figure 3:
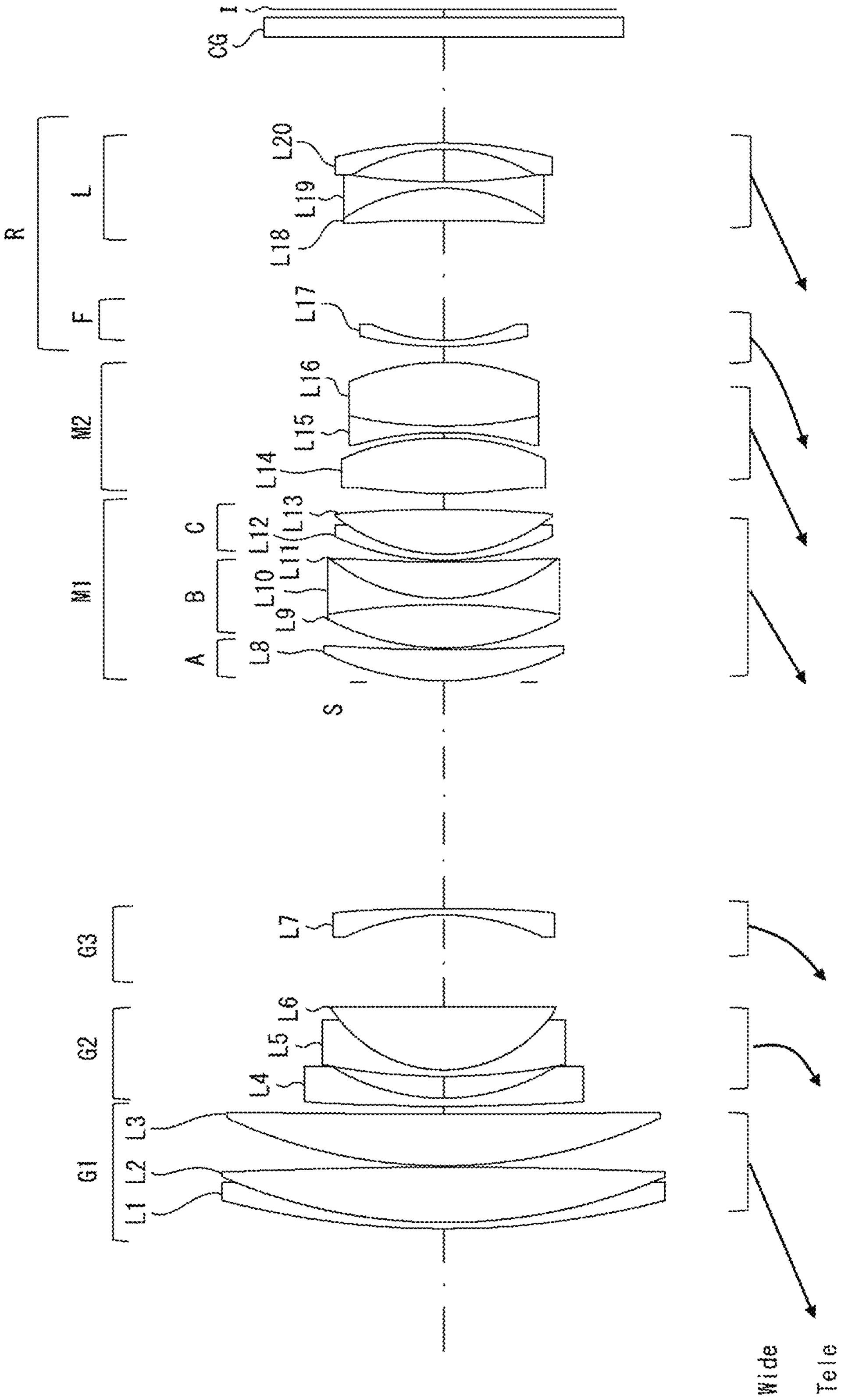
FIG. 3 is a lens cross-sectional view schematically illustrating an optical configuration at a wide angle end of a zoom lens according to Example 2.
Figure 4:
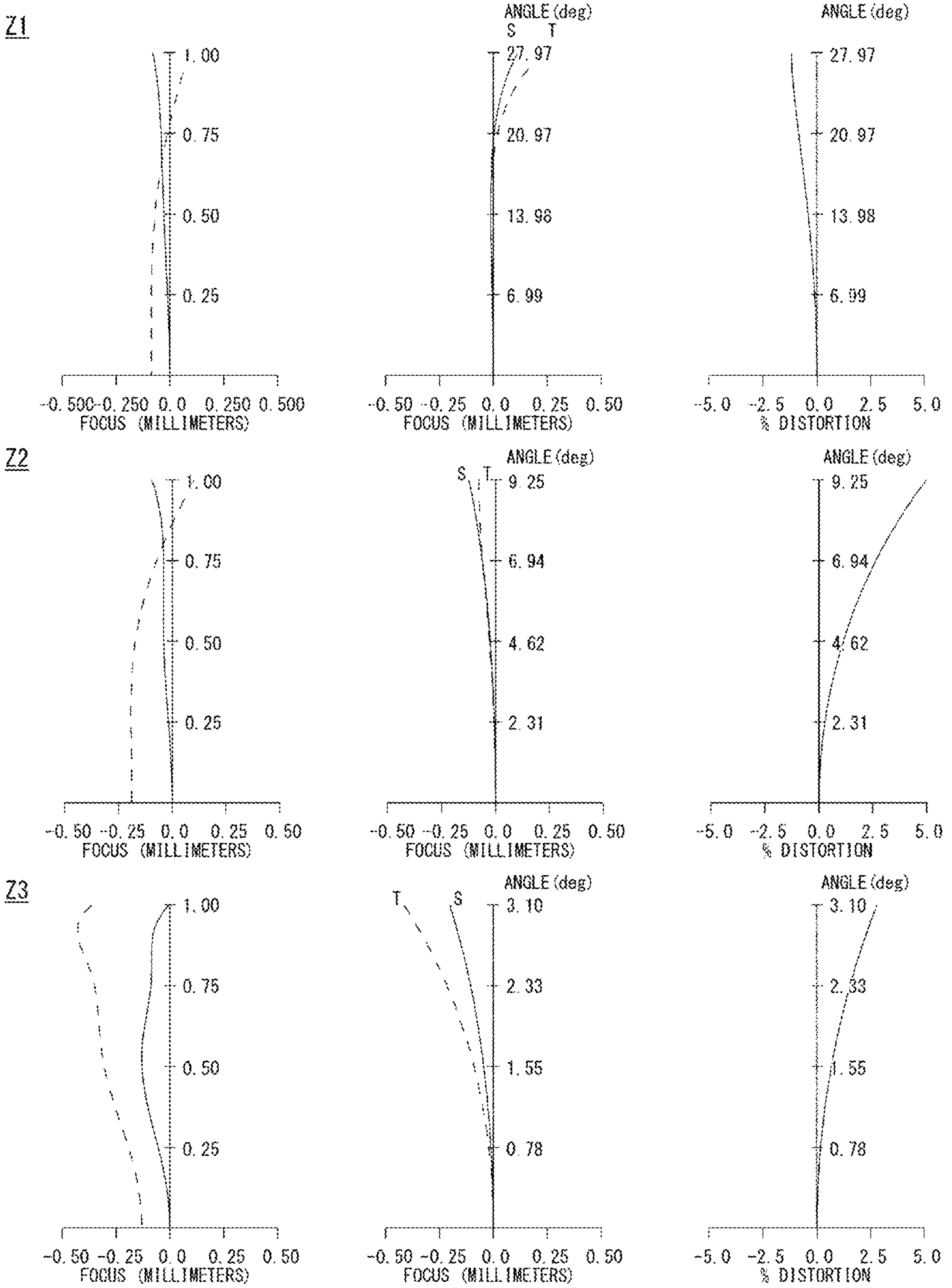
FIG. 4 illustrates spherical aberration diagrams, astigmatism diagrams, and distortion aberration diagrams of the optical system according to Example 2, where Z1 represents a longitudinal aberration diagram at the wide angle end, Z2 represents a longitudinal aberration diagram at the intermediate position, and Z3 represents a longitudinal aberration diagram at the telephoto end.

FIG. 3 is a diagram schematically illustrating an optical configuration of the zoom lens of Example 2 at the telephoto end. The zoom lens of Example 2 includes, in order from the object side, a first lens group G1 having positive refractive power, a second lens group G2 having negative refractive power, a third lens group G3 having negative refractive power, an intermediate lens group M1 having positive refractive power, an intermediate lens group M2 having positive refractive power, a lens group F having negative refractive power, and a lens group L having negative refractive power. The intermediate lens group M1 includes, in order from the object side, A group having positive refractive power, B group having negative refractive power, and C group having positive refractive power. The intermediate lens group M1, the intermediate lens group M2, the lens group F, and the lens group L correspond to the above-mentioned rear group. The lens group F and the lens group L correspond to the above-mentioned R group.

The zoom lens focuses from an object at infinity to a close object by moving the lens group F toward the object side.

The arrows in FIG. 3 indicate the direction and manner in which each lens group moves during zooming from the wide angle end to the telephoto end. As illustrated in FIG. 3, during zooming from the wide angle end to the telephoto end, the first lens group G1 gradually moves toward the object side, the second lens group G2 either does not move at first or moves toward the image surface side and then moves toward the object side, the third lens group G3 moves toward the object side slower at first and faster later, the intermediate lens group M1 gradually moves toward the object side, the intermediate lens group M2 gradually moves toward the object side, lens group F moves toward the object side slower at first and faster later, and lens group L gradually moves toward the object side.

The configuration of each lens group is described below. The first lens group G1 includes, in order from the object side, a cemented lens of a negative meniscus lens L1 with a convex surface facing the object side and a biconvex lens L2, and a positive meniscus lens L3 with a convex surface facing the object side.

The second lens group G2 includes, in order from the object side, a negative meniscus lens L4 with a convex surface facing the object side, and a cemented lens of a negative meniscus lens L5 with a convex surface facing the object side and a biconvex lens L6.

The third lens group G3 includes a negative meniscus lens L7 with a concave surface facing the object side.

The intermediate lens group M1 includes, in order from the object side, a positive meniscus lens L8 with a convex surface facing the object side, a cemented lens of a biconvex lens L9, a biconcave lens L10, and a positive meniscus lens L11 with a convex surface facing the object side, and a cemented lens of a negative meniscus lens L12 with a convex surface facing the object side and a biconvex lens L13.

The intermediate lens group M2 includes, in order from the object side, a biconvex lens L14 and a cemented lens of a biconcave lens L15 and a biconvex lens L16.

The lens group F includes a negative meniscus lens L17 with a convex surface facing the object side.

The lens group L includes, in order from the object side, a cemented lens of a positive meniscus lens L18 with a concave surface facing the object side and a biconcave lens L19, and a negative meniscus lens L20 with a concave surface facing the object side.

(2) Numerical Examples

Table 4 illustrates the surface data of the zoom lens.

TABLE 4

| Surface data No. | | R | D | Nd | Vd |
|---|---|---|---|---|---|
| 1 | | 111.112 | 0.800 | 1.910820 | 35.250 |
| 2 | | 71.088 | 7.032 | 1.437000 | 95.100 |
| 3 | | −643.286 | 0.200 | | |
| 4 | | 65.679 | 6.579 | 1.437000 | 95.100 |
| 5 | | 2188.473 | Variable | | |
| 6 | | 299.301 | 1.000 | 1.804200 | 46.500 |
| 7 | | 27.199 | 2.782 | | |
| 8 | | 80.412 | 0.800 | 1.804200 | 46.500 |
| 9 | | 16.961 | 8.074 | 1.770470 | 29.740 |
| 10 | | −1053.348 | Variable | | |
| 11 | | −29.452 | 0.800 | 1.618000 | 63.390 |
| 12 | ASPH | −402.633 | Variable | | |
| 13 | STOP | INF | 0.200 | | |
| 14 | | 34.410 | 3.977 | 1.921190 | 23.960 |
| 15 | | 216.742 | 0.200 | | |
| 16 | | 31.728 | 5.490 | 1.516800 | 64.200 |
| 17 | | −89.103 | 0.800 | 2.001000 | 29.130 |
| 18 | | 23.286 | 4.633 | 1.516800 | 64.200 |
| 19 | | 187.606 | 0.200 | | |
| 20 | | 33.200 | 0.800 | 1.870700 | 40.730 |
| 21 | | 22.135 | 5.684 | 1.516330 | 64.060 |
| 22 | ASPH | −147.890 | Variable | | |
| 23 | ASPH | 57.367 | 7.065 | 1.618810 | 63.850 |
| 24 | ASPH | −34.920 | 0.700 | | |
| 25 | | −40.685 | 0.800 | 2.001000 | 29.130 |
| 26 | | 55.601 | 8.122 | 1.672700 | 32.170 |
| 27 | | −30.562 | Variable | | |
| 28 | | 42.904 | 0.800 | 1.497000 | 81.610 |
| 29 | | 21.883 | Variable | | |
| 30 | | −195.786 | 4.088 | 1.854780 | 24.800 |
| 31 | | −22.937 | 0.800 | 1.729160 | 54.670 |
| 32 | | 81.382 | 4.143 | | |
| 33 | | −22.431 | 0.800 | 1.729160 | 54.670 |
| 34 | | −53.956 | Variable | | |
| 35 | | INF | 2.500 | 1.516800 | 64.200 |
| 36 | | INF | 1.000 | | |

Table 5 illustrates the specifications of the zoom lens of Example 2.

TABLE 5

| Specifications | Wide angle | Intermediate | Telephoto |
|---|---|---|---|
| f | 41.208 | 126.410 | 388.127 |
| Fno | 4.100 | 6.500 | 7.300 |
| ω | 27.966 | 9.250 | 3.101 |
| D(5) | 1.000 | 30.210 | 55.215 |
| D(10) | 11.626 | 7.360 | 6.812 |
| D(12) | 28.769 | 12.583 | 1.000 |
| D(22) | 2.000 | 2.418 | 2.000 |
| D(27) | 1.996 | 6.511 | 1.997 |
| D(29) | 15.241 | 10.726 | 15.240 |
| D(34) | 13.479 | 35.398 | 66.879 |

Table 6 illustrates aspheric coefficients of the aspheric surface in the zoom lens of Example 2.

TABLE 6

| Aspheric surface data No. | K | A4 | A6 |
|---|---|---|---|
| 12 | 0.00 | −7.773920E−06 | −2.666640E−09 |
| 22 | 0.00 | 2.104600E−06 | −3.440740E−09 |
| 23 | 0.00 | −1.754630E−05 | −4.190830E−08 |
| 24 | 0.00 | 4.543850E−07 | −3.311770E−08 |

TABLE 6-continued

| No. | A8 | A10 | A12 |
|---|---|---|---|
| 12 | 3.201870E−11 | −2.383810E−13 | 5.835560E−16 |
| 22 | 2.856760E−11 | −2.702400E−13 | 7.356970E−16 |
| 23 | 2.626230E−11 | −1.078860E−12 | 1.200970E−15 |
| 25 | −5.212780E−11 | −4.474700E−13 | 6.522490E−16 |

Example 3

(1) Optical System Configuration

Figure 5:
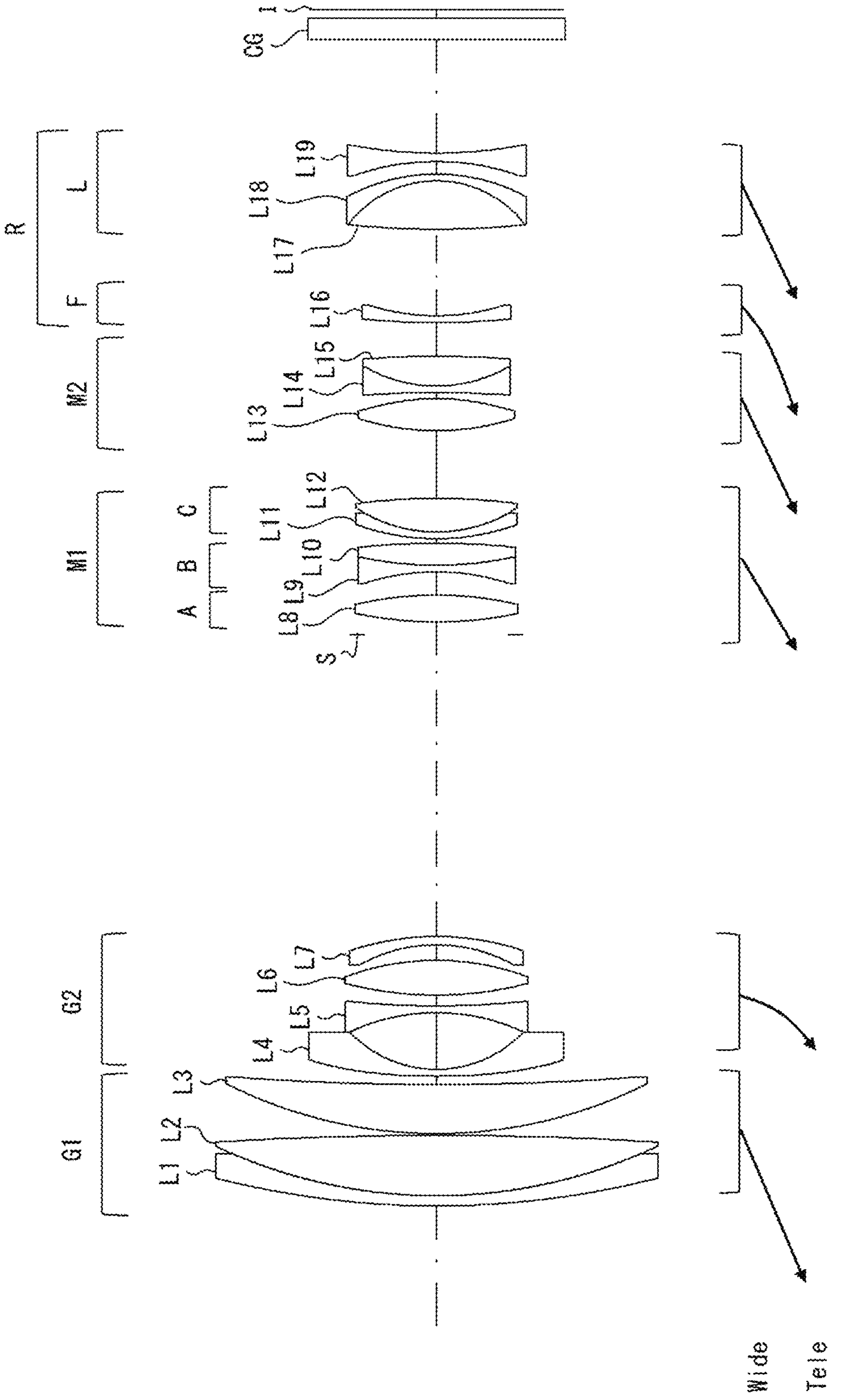
FIG. 5 is a lens cross-sectional view schematically illustrating an optical configuration at a wide angle end of a zoom lens according to Example 3.
Figure 6:
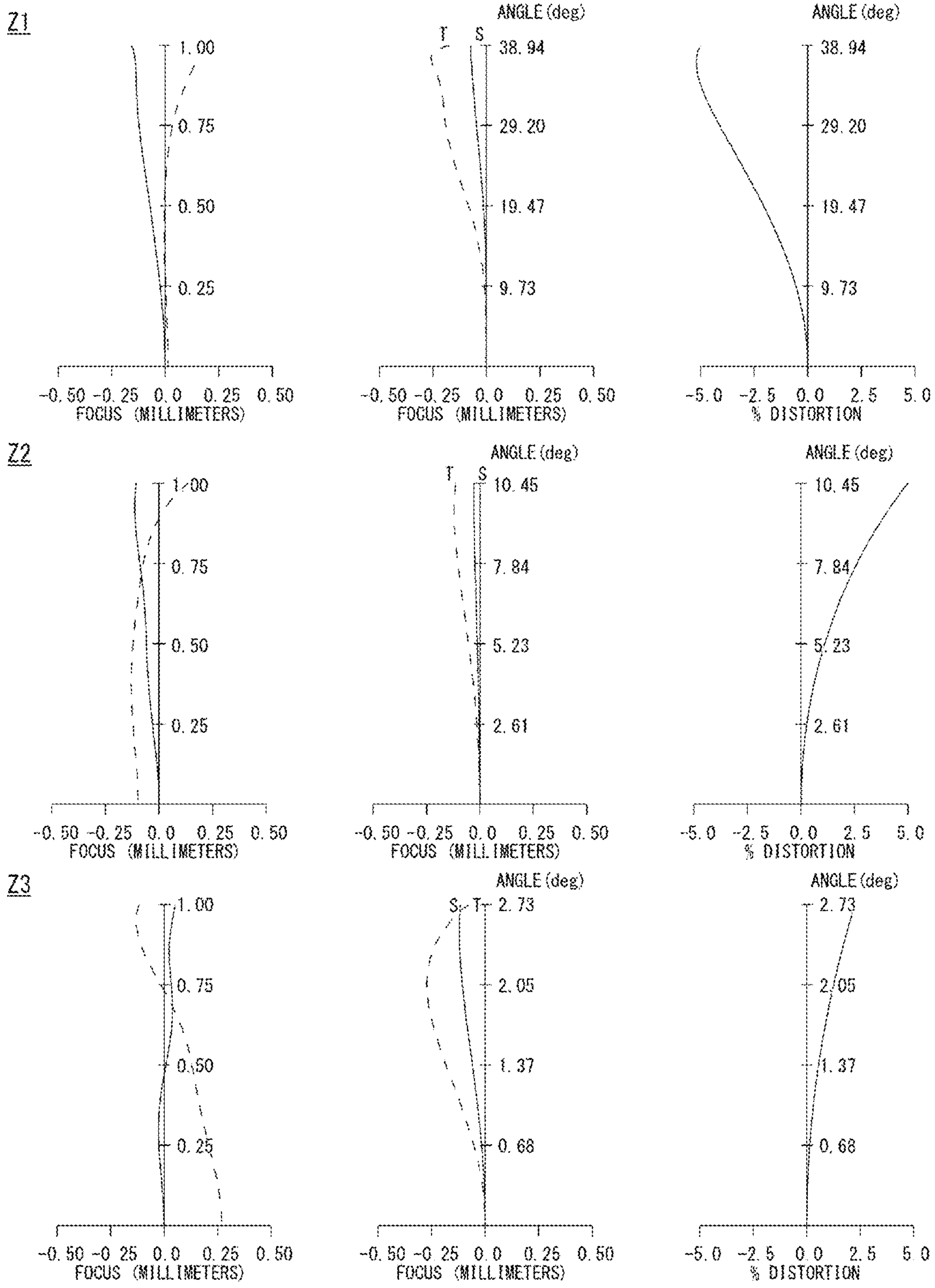
FIG. 6 illustrates spherical aberration diagrams, astigmatism diagrams, and distortion aberration diagrams of the optical system according to Example 3, where Z1 represents a longitudinal aberration diagram at the wide angle end, Z2 represents a longitudinal aberration diagram at the intermediate position, and Z3 represents a longitudinal aberration diagram at the telephoto end.

FIG. 5 is a diagram schematically illustrating an optical configuration of a zoom lens of Example 3 at the telephoto end. The zoom lens of Example 3 includes, in order from the object side, a first lens group G1 having positive refractive power, a second lens group G2 having negative refractive power, an intermediate lens group M1 having positive refractive power, an intermediate lens group M2 having positive refractive power, a lens group F having negative refractive power, and a lens group L having negative refractive power. The intermediate lens group M1 includes, in order from the object side, A group having positive refractive power, B group having negative refractive power, and C group having positive refractive power. The intermediate lens group M1, the intermediate lens group M2, the lens group F, and the lens group L correspond to the above-mentioned rear group. The lens group F and the lens group L correspond to the above-mentioned R group.

The zoom lens focuses from an object at infinity to a close object by moving the lens group F toward the object side.

The arrows in FIG. 5 indicate the direction and manner in which each lens group moves during zooming from the wide angle end to the telephoto end. As illustrated in FIG. 5, during zooming from the wide angle end to the telephoto end, the first lens group G1 gradually moves toward the object side, the second lens group G2 either does not move at first or moves toward the image surface side and then moves toward the object side, the intermediate lens group M1 gradually moves toward the object side, the intermediate lens group M2 gradually moves toward the object side, the lens group F moves toward the object side slowly at first and faster later, and the lens group L gradually moves toward the object side.

The configuration of each lens group is described below. The first lens group G1 includes, in order from the object side, a cemented lens of a negative meniscus lens L1 with a convex surface facing the object side and a biconvex lens L2, and a positive meniscus lens L3 with a convex surface facing the object side.

The second lens group G2 includes, in order from the object side, a negative meniscus lens L4 with a convex surface facing the object side, a biconcave lens L5, a biconvex lens L6, and a negative meniscus lens L7 with a concave surface facing the object side.

The intermediate lens group M1 includes, in order from the object side, a biconvex lens L8, a cemented lens of a biconcave lens L9 and a biconvex lens L10, and a cemented lens of a negative meniscus lens L11 with a convex surface facing the object side and a biconvex lens L12.

The intermediate lens group M2 includes, in order from the object side, a biconvex lens L13 and a cemented lens of a biconcave lens L14 and a biconvex lens L15.

The lens group F includes a concave meniscus lens L16 with a convex surface facing the object side.

The lens group L includes, in order from the object side, a cemented lens of a biconvex lens L17 and a negative meniscus lens L18 with a concave surface facing the object side, and a biconcave lens L19.

(2) Numerical Examples

Table 7 illustrates the surface data of the zoom lens.

TABLE 7

| Surface data No. | | R | D | Nd | Vd |
|---|---|---|---|---|---|
| 1 | | 106.581 | 1.200 | 1.870700 | 40.730 |
| 2 | | 61.356 | 7.164 | 1.437000 | 95.100 |
| 3 | | −427.231 | 0.200 | | |
| 4 | | 55.554 | 5.832 | 1.497000 | 81.610 |
| 5 | | 317.904 | Variable | | |
| 6 | ASPH | 76.902 | 0.800 | 1.953750 | 32.320 |
| 7 | | 14.164 | 6.732 | | |
| 8 | | −24.384 | 0.800 | 1.729160 | 54.670 |
| 9 | | 101.357 | 1.272 | | |
| 10 | | 42.045 | 4.139 | 1.854510 | 25.150 |
| 11 | | −30.861 | 1.846 | | |
| 12 | | −18.739 | 1.001 | 1.834810 | 42.720 |
| 13 | | −32.055 | Variable | | |
| 14 | STOP | INF | 1.500 | | |
| 15 | | 46.441 | 3.180 | 1.854780 | 24.800 |
| 16 | | −41.785 | 2.749 | | |
| 17 | | −27.743 | 0.800 | 2.001000 | 29.130 |
| 18 | | 43.710 | 2.628 | 1.618000 | 63.390 |
| 19 | | −83.754 | 0.500 | | |
| 20 | | 27.648 | 0.815 | 1.903660 | 31.310 |
| 21 | | 17.439 | 4.000 | 1.516800 | 64.200 |
| 22 | ASPH | −69.461 | Variable | | |
| 23 | ASPH | 30.394 | 3.802 | 1.618810 | 63.850 |
| 24 | ASPH | −26.077 | 0.701 | | |
| 25 | | −129.970 | 0.800 | 2.001000 | 29.130 |
| 26 | | 17.152 | 3.544 | 1.688930 | 31.160 |
| 27 | | −110.472 | Variable | | |
| 28 | | 92.986 | 0.800 | 1.729160 | 54.670 |
| 29 | | 26.257 | Variable | | |
| 30 | | 98.725 | 5.740 | 1.647690 | 33.840 |
| 31 | | −13.235 | 0.800 | 1.804200 | 46.500 |
| 32 | | −22.505 | 1.503 | | |
| 33 | | −29.398 | 1.000 | 1.804200 | 46.500 |
| 34 | | 55.482 | Variable | | |
| 35 | | INF | 2.500 | 1.516800 | 64.200 |
| 36 | | INF | 1.000 | | |

Table 8 illustrates the specifications of the zoom lens of Example 3.

TABLE 8

| Specifications | Wide angle | Intermediate | Telephoto |
|---|---|---|---|
| f | 18.543 | 73.437 | 290.998 |
| Fno | 3.481 | 5.656 | 8.212 |
| ω | 38.938 | 10.450 | 2.731 |
| D(5) | 1.000 | 35.427 | 66.530 |
| D(13) | 35.853 | 7.808 | 1.500 |
| D(22) | 8.034 | 4.422 | 2.634 |
| D(27) | 3.989 | 10.939 | 1.001 |
| D(29) | 10.278 | 3.328 | 13.266 |
| D(34) | 13.500 | 34.324 | 67.731 |

Table 9 illustrates aspheric coefficients of the aspheric surface in the zoom lens of Example 3.

TABLE 9

| Aspheric surface data No. | K | A4 | A6 |
|---|---|---|---|
| 6 | 0.00 | 6.741350E−06 | 9.342860E−09 |
| 22 | 0.00 | 3.133110E−06 | −6.069810E−10 |
| 23 | 0.00 | −3.153600E−06 | 2.659370E−10 |
| 24 | 0.00 | 2.891270E−05 | −2.032010E−08 |
| **No.** | **A8** | **A10** | **A12** |
| 6 | −9.966290E−11 | 3.807520E−13 | 2.437220E−16 |
| 22 | −3.399520E−10 | 5.643530E−12 | −3.536760E−14 |
| 23 | 4.639900E−10 | −3.663480E−12 | 3.735970E−1 |
| 24 | 1.469060E−10 | −3.690610E−13 | 2.303290E−14 |

Example 4

(1) Optical System Configuration

Figure 7:
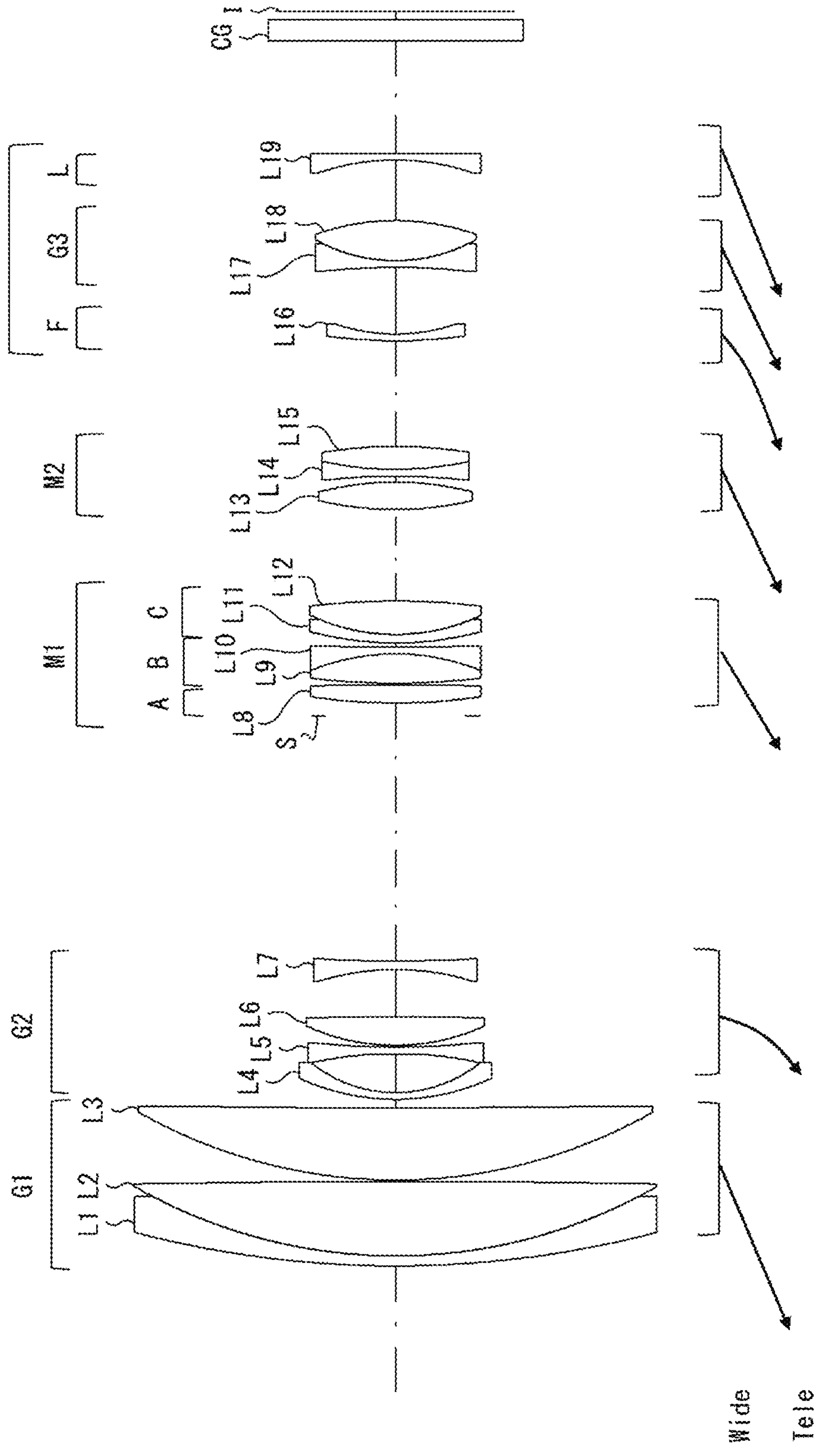
FIG. 7 is a lens cross-sectional view schematically illustrating an optical configuration at a wide angle end of a zoom lens according to Example 4.
Figure 8:
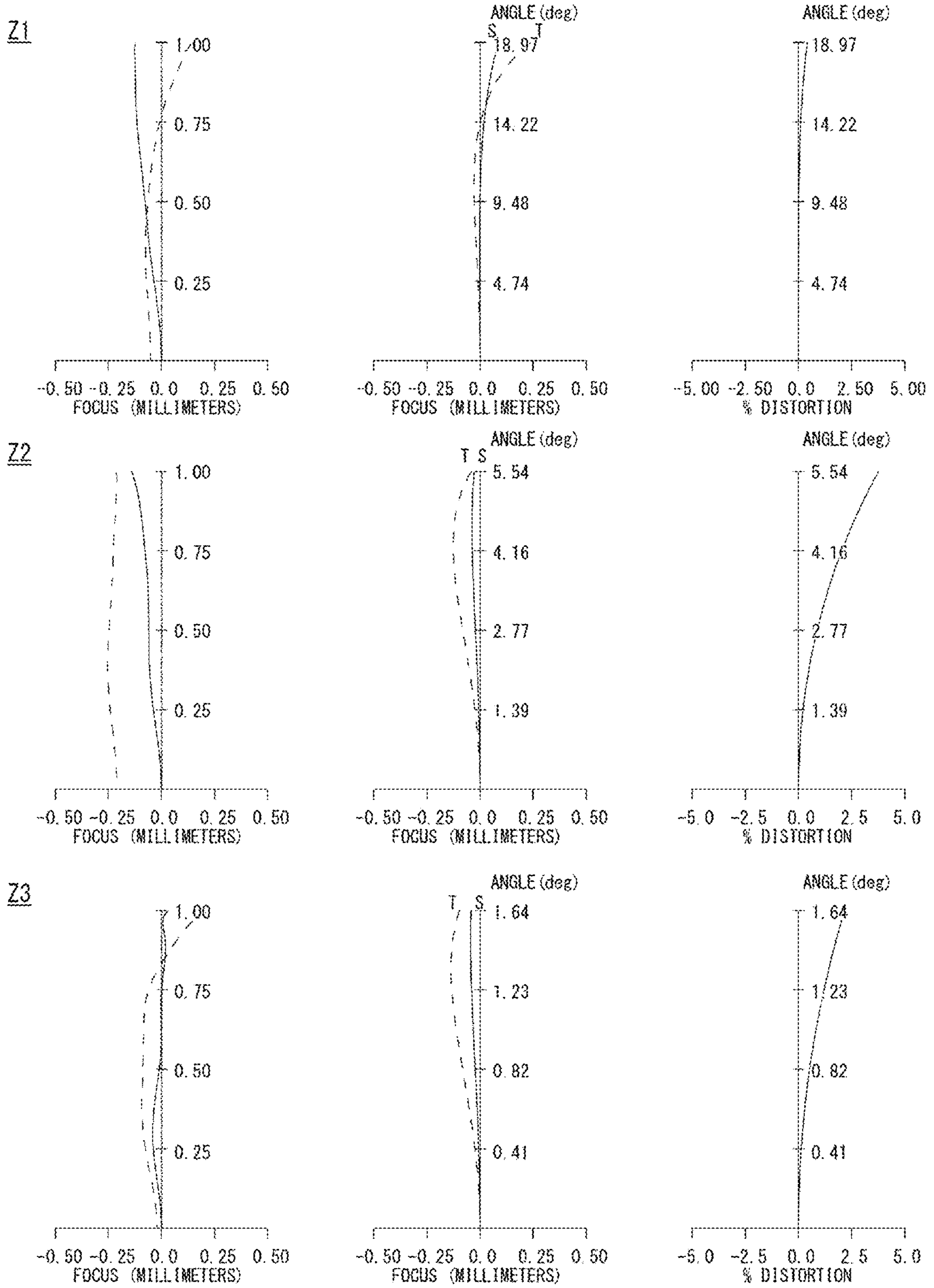
FIG. 8 illustrates spherical aberration diagrams, astigmatism diagrams, and distortion aberration diagrams of the optical system according to Example 4, where Z1 represents a longitudinal aberration diagram at the wide angle end, Z2 represents a longitudinal aberration diagram at the intermediate position, and Z3 represents a longitudinal aberration diagram at the telephoto end.

FIG. 7 is a diagram schematically illustrating an optical configuration of a zoom lens of Example 4 at the telephoto end. The zoom lens of Example 4 includes, in order from the object side, a first lens group G1 having positive refractive power, a second lens group G2 having negative refractive power, an intermediate lens group M1 having positive refractive power, an intermediate lens group M2 having positive refractive power, a lens group F having negative refractive power, a third lens group G3 having positive refractive power, and a lens group L having negative refractive power. The intermediate lens group M1 includes, in order from the object side, A group having positive refractive power, B group having negative refractive power, and C group having positive refractive power. The intermediate lens group M1, the intermediate lens group M2, the lens group F, the third lens group G3, and the lens group L correspond to the above-mentioned rear group. The lens group F, the third lens group G3, and the lens group L correspond to the above-mentioned R group.

The zoom lens focuses from an object at infinity to a close object by moving the lens group F toward the object side.

The arrows in FIG. 7 indicate the direction and manner in which each lens group moves during zooming from the wide angle end to the telephoto end. As illustrated in FIG. 3, during zooming from the wide angle end to the telephoto end, the first lens group G1 gradually moves toward the object side, the second lens group G2 either does not move at first or moves toward the image surface side and then moves toward the object side, the intermediate lens group M1 gradually moves toward the object side, the intermediate lens group M2 gradually moves toward the object side, the lens group F moves toward the object side slowly at first and faster later, the third lens group G3 gradually moves toward the object side, and the lens group L gradually moves toward the object side.

The configuration of each lens group is described below. The first lens group G1 includes, in order from the object side, a cemented lens of a negative meniscus lens L1 with a convex surface facing the object side and a biconvex lens L2, and a positive meniscus lens L3 with a convex surface facing the object side.

The second lens group G2 includes, in order from the object side, a negative meniscus lens L4 with a convex surface facing the object side, a biconcave lens L5, a biconvex lens L6, and a biconcave lens L7.

The intermediate lens group M1 includes, in order from the object side, a biconvex lens L8, a cemented lens of a biconvex lens L9 and a biconcave lens L10, and a cemented lens of a positive meniscus lens L11 with a convex surface facing the object side and a biconvex lens L12.

The intermediate lens group M2 includes, in order from the object side, a biconvex lens L13 and a cemented lens of a biconcave lens L14 and a biconvex lens L15.

The lens group F includes a negative meniscus lens L16 with a convex surface facing the object side.

The third lens group G3 includes a cemented lens of a biconcave lens L17 and a biconvex lens L18.

The lens group L includes, in order from the object side, a negative meniscus lens L19 with a convex surface facing the object side.

(2) Numerical Examples

Table 10 illustrates the surface data of the zoom lens.

TABLE 10

| Surface data No. | | R | D | Nd | Vd |
|---|---|---|---|---|---|
| 1 | | 123.084 | 1.200 | 1.870700 | 40.730 |
| 2 | | 62.860 | 8.867 | 1.437000 | 95.100 |
| 3 | | −1888.659 | 0.200 | | |
| 4 | | 62.147 | 8.650 | 1.497000 | 81.610 |
| 5 | | 2547.487 | Variable | | |
| 6 | | 27.364 | 0.800 | 1.834810 | 42.720 |
| 7 | | 16.044 | 4.650 | | |
| 8 | | −48.004 | 0.800 | 1.729160 | 54.670 |
| 9 | | 94.714 | 0.202 | | |
| 10 | | 25.688 | 3.423 | 1.854510 | 25.150 |
| 11 | | −380.211 | 5.641 | | |
| 12 | | −30.830 | 1.000 | 1.804200 | 46.500 |
| 13 | | 147.357 | Variable | | |
| 14 | STOP | INF | 1.500 | | |
| 15 | | 66.258 | 2.168 | 1.806100 | 40.730 |
| 16 | | −357.546 | 0.201 | | |
| 17 | | 83.859 | 3.529 | 1.698950 | 30.050 |
| 18 | | −26.655 | 0.800 | 2.001000 | 29.130 |
| 19 | | 290.007 | 0.506 | | |
| 20 | | 39.524 | 1.000 | 1.870700 | 40.730 |
| 21 | | 23.677 | 4.000 | 1.497000 | 81.610 |
| 22 | | −84.948 | Variable | | |
| 23 | ASPH | 39.371 | 3.298 | 1.592010 | 67.020 |
| 24 | ASPH | −33.102 | 0.700 | | |
| 25 | | −72.900 | 0.800 | 2.001000 | 29.130 |
| 26 | | 40.966 | 2.746 | 1.620040 | 36.300 |
| 27 | | −54.850 | Variable | | |
| 28 | | 60.904 | 0.800 | 1.592820 | 68.620 |
| 29 | | 22.079 | Variable | | |
| 30 | | −76.129 | 0.800 | 1.729160 | 54.670 |
| 31 | | 19.496 | 4.783 | 1.672700 | 32.170 |
| 32 | | −28.648 | Variable | | |
| 33 | | −28.495 | 0.800 | 1.870700 | 40.730 |
| 34 | | −4654.016 | Variable | | |
| 35 | | INF | 2.500 | 1.516800 | 64.200 |
| 36 | | INF | 1.000 | | |

Table 11 illustrates the specifications of the zoom lens of Example 4.

TABLE 11

| Specifications | Wide angle | Intermediate | Telephoto |
|---|---|---|---|
| f | 41.248 | 141.384 | 485.008 |
| Fno | 4.605 | 6.501 | 8.200 |
| ω | 18.966 | 5.541 | 1.640 |
| D(5) | 1.000 | 49.824 | 73.207 |
| D(13) | 29.346 | 13.490 | 1.500 |
| D(22) | 10.948 | 2.480 | 10.510 |
| D(27) | 12.626 | 14.231 | 1.128 |
| D(29) | 7.978 | 6.373 | 19.476 |
| D(32) | 7.248 | 6.348 | 3.038 |
| D(34) | 13.492 | 26.390 | 53.786 |

Table 12 illustrates aspheric coefficients of the aspheric surface in the zoom lens of Example 4.

TABLE 12

| Aspheric surface data No. | K | A4 | A6 |
|---|---|---|---|
| 23 | 0.00 | −3.524240E−06 | −3.640660E−08 |
| 24 | 0.00 | 1.267780E−05 | −1.019830E−08 |
| **No.** | **A8** | **A10** | **A12** |
| 23 | 2.396240E−09 | −4.052570E−11 | 2.852050E−13 |
| 24 | 1.405120E−09 | −2.905700E−11 | 2.375070E−13 |

Example 5

(1) Optical System Configuration

Figure 9:
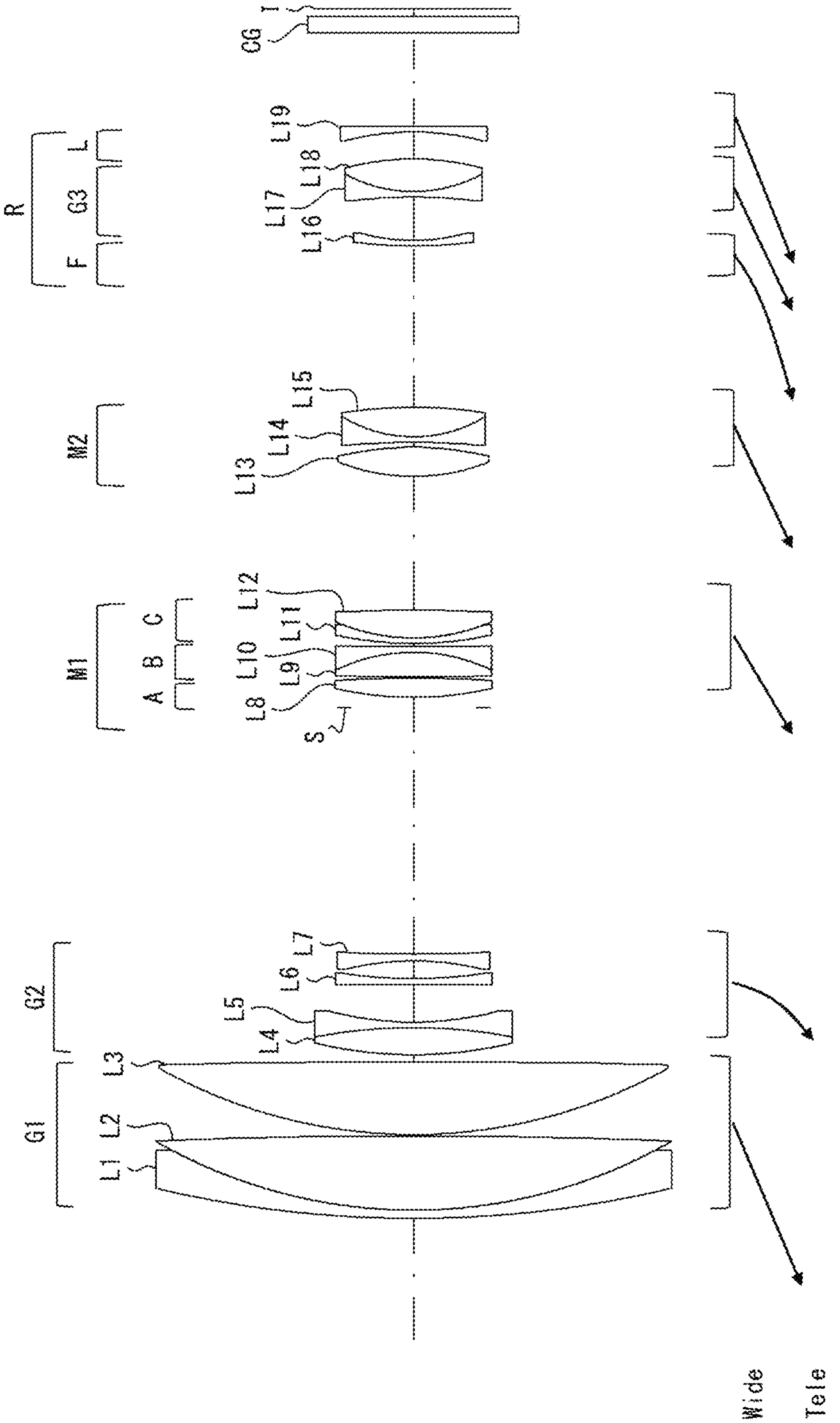
FIG. 9 is a lens cross-sectional view schematically illustrating an optical configuration at a wide angle end of a zoom lens according to Example 5.
Figure 10:
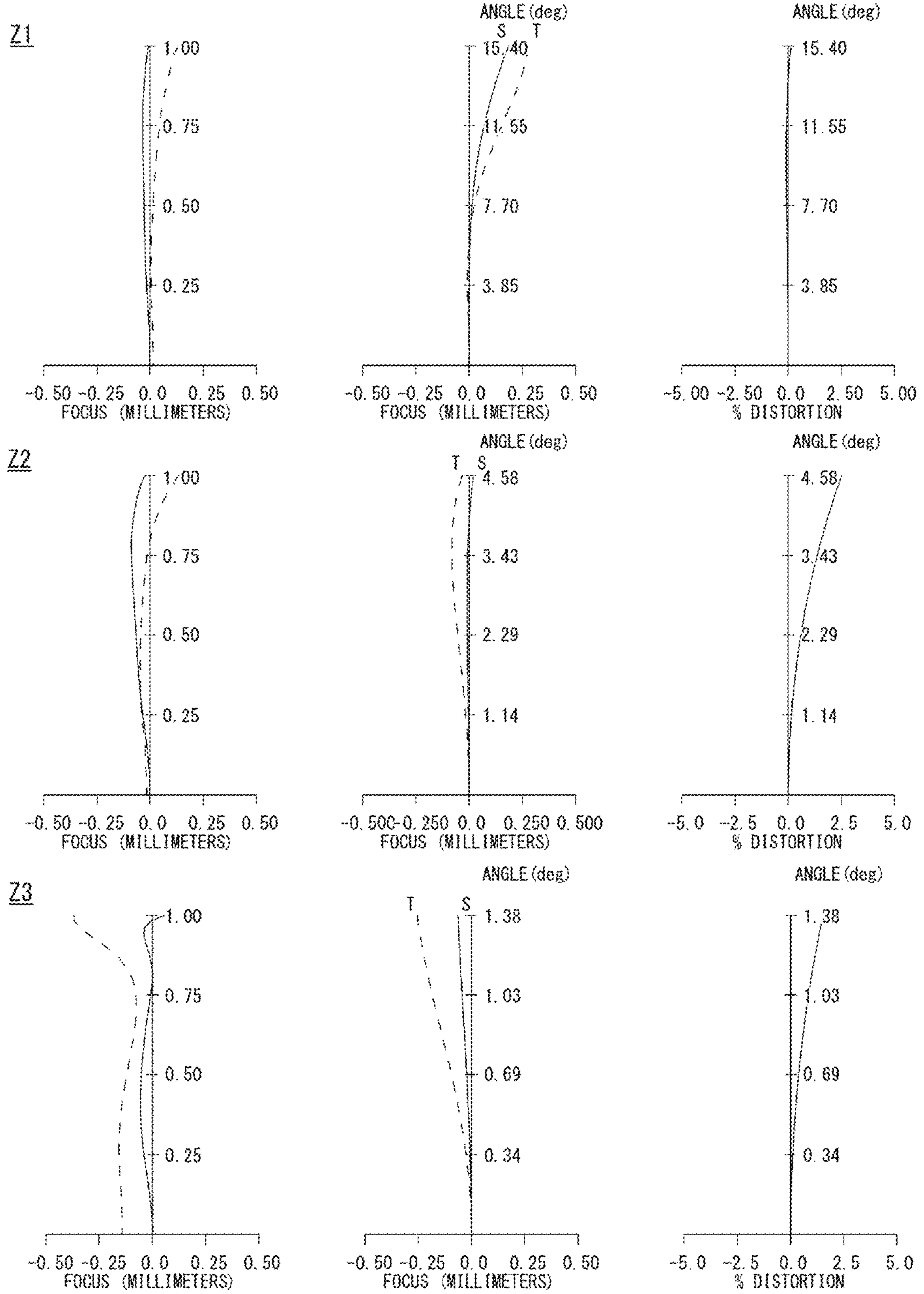
FIG. 10 illustrates spherical aberration diagrams, astigmatism diagrams, and distortion aberration diagrams of the optical system according to Example 5, where Z1 represents a longitudinal aberration diagram at the wide angle end, Z2 represents a longitudinal aberration diagram at the intermediate position, and Z3 represents a longitudinal aberration diagram at the telephoto end.

FIG. 9 is a diagram schematically illustrating an optical configuration of a zoom lens of Example 5 at the telephoto end. The zoom lens of Example 5 includes, in order from the object side, a first lens group G1 having positive refractive power, a second lens group G2 having negative refractive power, an intermediate lens group M1 having positive refractive power, an intermediate lens group M2 having positive refractive power, a lens group F having negative refractive power, a third lens group G3 having positive refractive power, and a lens group L having negative refractive power. The intermediate lens group M1 includes, in order from the object side, A group having positive refractive power, B group having negative refractive power, and C group having positive refractive power. The intermediate lens group M1, the intermediate lens group M2, the lens group F, the third lens group G3, and the lens group L correspond to the above-mentioned rear group. The lens group F, the third lens group G3, and the lens group L correspond to the above-mentioned R group.

The zoom lens focuses from an object at infinity to a close object by moving the lens group F toward the object side.

The arrows in FIG. 9 indicate the direction and manner in which each lens group moves during zooming from the wide angle end to the telephoto end. As illustrated in FIG. 9, during zooming from the wide angle end to the telephoto end, the first lens group G1 gradually moves toward the object side, the second lens group G2 either does not move at first or moves toward the image surface side and then moves toward the object side, the intermediate lens group M1 gradually moves toward the object side, the intermediate lens group M2 gradually moves toward the object side, the lens group F moves toward the object side slowly at first and faster later, the third lens group G3 gradually moves toward the object side, and the lens group L gradually moves toward the object side.

The configuration of each lens group is described below. The first lens group G1 includes, in order from the object side, a cemented lens of a negative meniscus lens L1 with a convex surface facing the object side and a biconvex lens L2, and a biconvex lens L3.

The second lens group G2 includes, in order from the object side, a cemented lens of a biconvex lens L4 and a biconcave lens L5, a biconcave lens L6, and a biconcave lens L7.

The intermediate lens group M1 includes, in order from the object side, a biconvex lens L8, a cemented lens of a biconvex lens L9 and a negative meniscus lens L10 with a concave surface facing the object surface, and a cemented lens of a negative meniscus lens L11 with a convex surface facing the object side and a biconvex lens L12.

The intermediate lens group M2 includes, in order from the object side, a biconvex lens L13 and a cemented lens of a biconcave lens L14 and a biconvex lens L15.

The lens group F includes a negative meniscus lens L16 with a convex surface facing the object side.

The third lens group G3 includes, in order from the object side, a cemented lens of a biconcave lens L17 and a biconvex lens L18.

The lens group L includes a biconcave lens L19.

(2) Numerical Examples

Table 13 illustrates the surface data of the zoom lens.

TABLE 13

| Surface data No. | | R | D | Nd | Vd |
|---|---|---|---|---|---|
| 1 | | 161.851 | 1.200 | 1.870700 | 40.730 |
| 2 | | 74.926 | 10.737 | 1.437000 | 95.100 |
| 3 | | −976.687 | 0.200 | | |
| 4 | | 75.504 | 10.535 | 1.497000 | 81.610 |
| 5 | | −1427.877 | Variable | | |
| 6 | | 60.350 | 3.937 | 1.846660 | 23.780 |
| 7 | | −75.869 | 0.800 | 1.592820 | 68.620 |
| 8 | | 48.223 | 5.494 | | |
| 9 | | −429.392 | 0.800 | 1.870700 | 40.730 |
| 10 | | 67.831 | 2.545 | | |
| 11 | | −41.475 | 1.000 | 1.953750 | 32.320 |
| 12 | | 213.032 | Variable | | |
| 13 | STOP | INF | 1.500 | | |
| 14 | | 49.394 | 2.781 | 1.696800 | 55.460 |
| 15 | | −196.292 | 0.200 | | |
| 16 | | 849.274 | 3.536 | 1.728250 | 28.320 |
| 17 | | −26.315 | 0.800 | 2.001000 | 29.130 |
| 18 | | 501.040 | 0.500 | | |
| 19 | | 52.271 | 0.800 | 1.804200 | 46.500 |
| 20 | | 28.820 | 4.000 | 1.516800 | 64.200 |
| 21 | | −270.889 | Variable | | |
| 22 | ASPH | 29.854 | 4.209 | 1.618810 | 63.850 |
| 23 | ASPH | −41.616 | 0.700 | | |
| 24 | | −110.467 | 0.800 | 1.834810 | 42.720 |
| 25 | | 19.923 | 4.284 | 1.517420 | 52.150 |
| 26 | | −65.228 | Variable | | |
| 27 | | 70.882 | 0.800 | 1.729160 | 54.670 |
| 28 | | 28.742 | Variable | | |
| 29 | | −72.596 | 0.800 | 1.729160 | 54.670 |
| 30 | | 20.652 | 4.707 | 1.672700 | 32.170 |
| 31 | | −37.915 | Variable | | |
| 32 | | −39.396 | 0.800 | 1.755000 | 52.320 |
| 33 | | −5675.591 | Variable | | |
| 34 | | INF | 2.500 | 1.516800 | 64.200 |
| 35 | | INF | 1.000 | | |

Table 14 illustrates the specifications of the zoom lens of Example 5.

TABLE 14

| Specifications | Wide angle | Intermediate | Telephoto |
|---|---|---|---|
| f | 51.518 | 173.153 | 582.185 |
| Fno | 4.600 | 6.500 | 8.200 |
| ω | 15.399 | 4.578 | 1.376 |
| D(5) | 1.000 | 55.620 | 82.334 |
| D(12) | 35.638 | 23.564 | 1.500 |
| D(21) | 19.388 | 2.835 | 6.054 |
| D(26) | 23.346 | 14.002 | 0.997 |
| D(28) | 6.257 | 15.601 | 28.606 |
| D(31) | 3.916 | 6.835 | 1.000 |
| D(33) | 13.488 | 28.691 | 62.564 |

Table 15 illustrates aspheric coefficients of the aspheric surface in the zoom lens of Example 5.

TABLE 15

| Aspheric surface data No. | K | A4 | A6 |
|---|---|---|---|
| 22 | 0.00 | −2.854210E−06 | 2.612630E−08 |
| 23 | 0.00 | 8.939510E−06 | 4.071040E−08 |
| **No.** | **A8** | **A10** | **A12** |
| 22 | −7.899660E−11 | −2.150510E−12 | 2.480900E−14 |
| 23 | −6.187070E−10 | 3.438190E−12 | 4.073480E−15 |

Example 6

(1) Optical System Configuration

Figure 11:
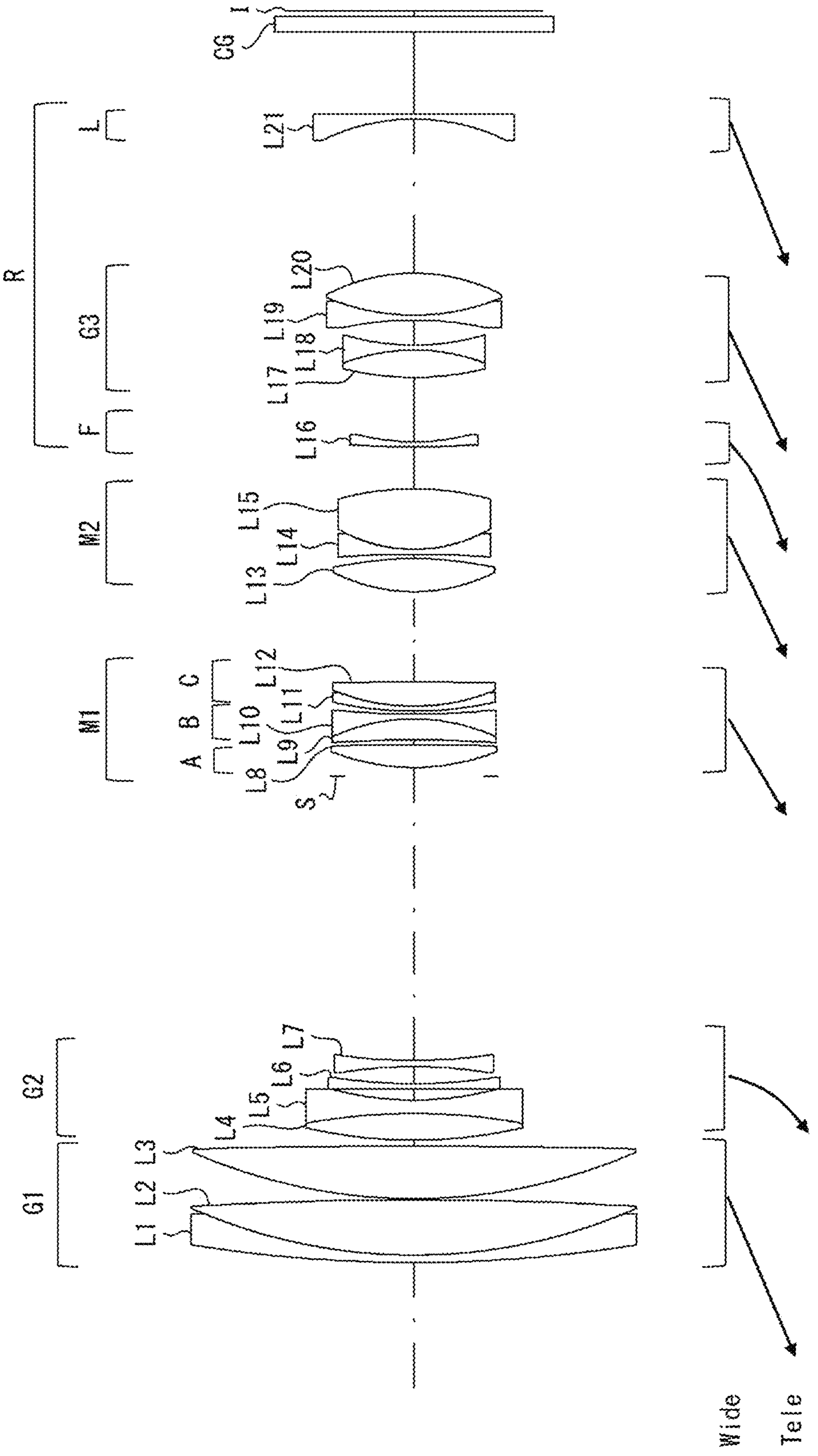
FIG. 11 is a lens cross-sectional view schematically illustrating an optical configuration at a wide angle end of a zoom lens according to Example 6.
Figure 12:
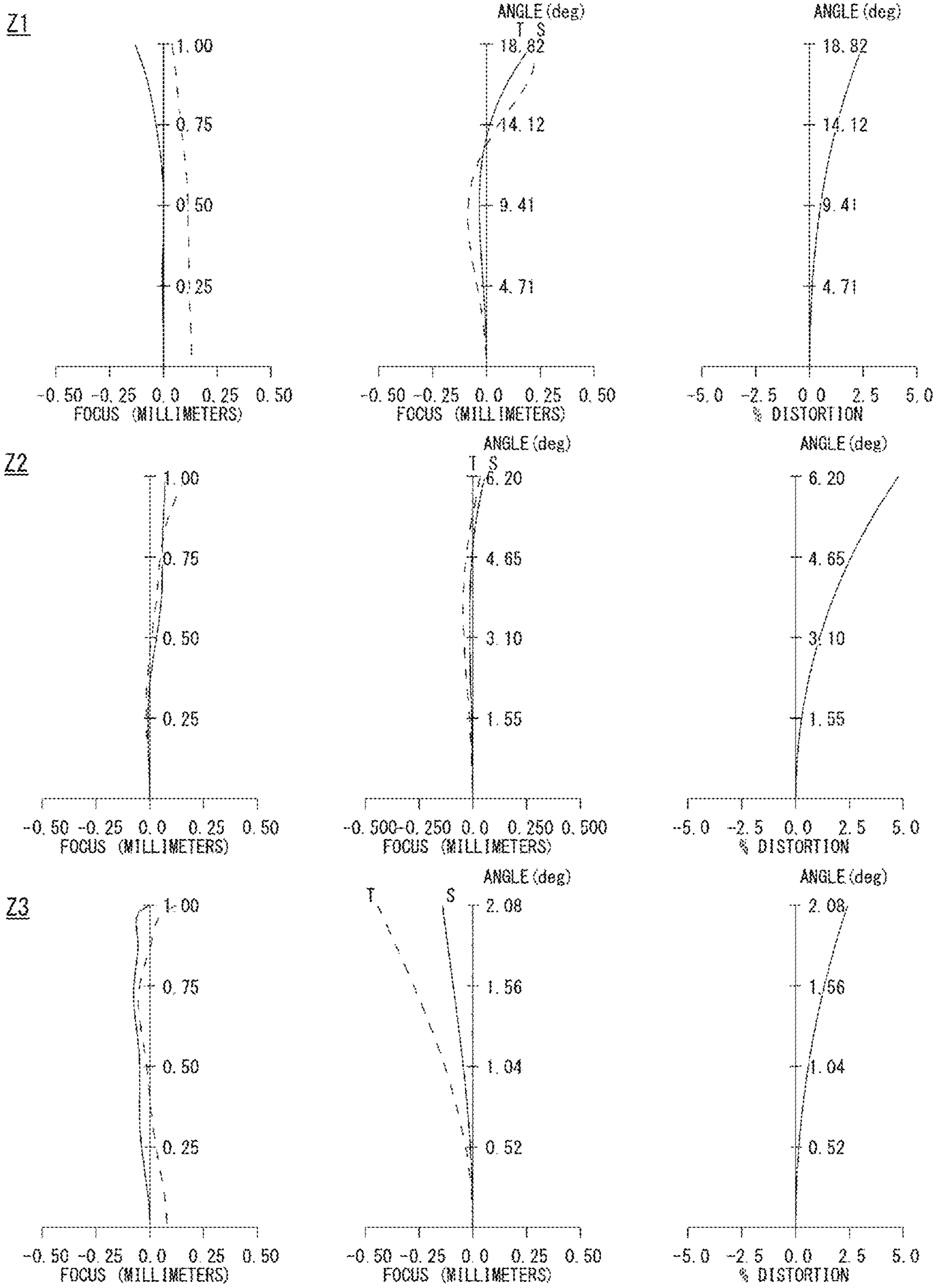
FIG. 12 illustrates spherical aberration diagrams, astigmatism diagrams, and distortion aberration diagrams of the optical system according to Example 6, where Z1 represents a longitudinal aberration diagram at the wide angle end, Z2 represents a longitudinal aberration diagram at the intermediate position, and Z3 represents a longitudinal aberration diagram at the telephoto end.

FIG. 11 is a diagram schematically illustrating an optical configuration of a zoom lens of Example 6 at the telephoto end. The zoom lens of Example 6 includes, in order from the object side, a first lens group G1 having positive refractive power, a second lens group G2 having negative refractive power, an intermediate lens group M1 having positive refractive power, an intermediate lens group M2 having positive refractive power, a lens group F having negative refractive power, a third lens group G3 having positive refractive power, and a lens group L having negative refractive power. The intermediate lens group M1 includes, in order from the object side, A group having positive refractive power, B group having negative refractive power, and C group having positive refractive power. The intermediate lens group M1, the intermediate lens group M2, the lens group F, the third lens group G3, and the lens group L correspond to the above-mentioned rear group. The lens group F, the third lens group G3, and the lens group L correspond to the above-mentioned R group.

The zoom lens focuses from an object at infinity to a close object by moving the lens group F toward the object side.

The arrows in FIG. 11 indicate the direction and manner in which each lens group moves during zooming from the wide angle end to the telephoto end. As illustrated in FIG. 11, during zooming from the wide angle end to the telephoto end, the first lens group G1 gradually moves toward the object side, the second lens group G2 either does not move at first or moves toward the image surface side and then moves toward the object side, the intermediate lens group M1 gradually moves toward the object side, the intermediate lens group M2 gradually moves toward the object side, the lens group F moves toward the object side slowly at first and faster later, the third lens group G3 gradually moves toward the object side, and the lens group L gradually moves toward the object side.

The configuration of each lens group is described below. The first lens group G1 includes, in order from the object side, a cemented lens of a negative meniscus lens L1 with a convex surface facing the object side and a biconvex lens L2, and a biconvex lens L3.

The second lens group G2 includes, in order from the object side, a cemented lens of a positive meniscus lens L4 with a convex surface facing the object side and a biconcave lens L5, a biconcave lens L6, and a biconcave lens L7.

The intermediate lens group M1 includes, in order from the object side, a biconvex lens L8, a cemented lens of a positive meniscus lens L9 with a concave surface facing the object side and a biconcave lens L10, and a cemented lens of a negative meniscus lens L11 with a convex surface facing the object side and a biconvex lens L12.

The intermediate lens group M2 includes, in order from the object side, a biconvex lens L13 and a cemented lens of a biconcave lens L14 and a biconvex lens L15.

The lens group F includes a negative meniscus lens L16 with a convex surface facing the object side.

The third lens group G3 includes, in order from the object side, a cemented lens of a biconvex lens L17 and a biconcave lens L18, and a cemented lens of a biconcave lens L19 and a biconvex lens L20.

The lens group L includes a negative meniscus lens L21 with a concave surface facing the object surface.

(2) Numerical Examples

Table 16 illustrates the surface data of the zoom lens.

TABLE 16

| Surface data No. | | R | D | Nd | Vd |
|---|---|---|---|---|---|
| 1 | | 231.295 | 1.200 | 1.834810 | 42.720 |
| 2 | | 90.335 | 9.060 | 1.437000 | 95.100 |
| 3 | | −622.345 | 0.200 | | |
| 4 | | 90.259 | 8.578 | 1.497000 | 81.610 |
| 5 | | −1419.574 | Variable | | |
| 6 | | 78.374 | 4.344 | 1.854780 | 24.800 |
| 7 | | −99.298 | 2.225 | 1.497000 | 81.610 |
| 8 | | 51.973 | 1.866 | | |
| 9 | | −675.886 | 0.800 | 1.834810 | 42.720 |
| 10 | | 86.447 | 2.798 | | |
| 11 | | −74.370 | 1.000 | 1.870700 | 40.730 |
| 12 | | 84.743 | Variable | | |
| 13 | STOP | INF | 1.500 | | |
| 14 | | 36.938 | 3.711 | 1.647690 | 33.840 |
| 15 | | −408.078 | 0.765 | | |
| 16 | | −211.183 | 3.436 | 1.854510 | 25.150 |
| 17 | | −32.221 | 0.800 | 2.001000 | 29.130 |
| 18 | | 126.815 | 0.500 | | |
| 19 | | 60.005 | 0.800 | 1.834810 | 42.720 |
| 20 | | 34.897 | 4.000 | 1.518230 | 58.960 |
| 21 | | −512.633 | Variable | | |
| 22 | ASPH | 27.955 | 5.452 | 1.618810 | 63.850 |
| 23 | ASPH | −52.938 | 0.703 | | |
| 24 | | −164.103 | 0.800 | 1.953750 | 32.320 |
| 25 | | 24.898 | 9.899 | 1.517420 | 52.150 |
| 26 | | −47.532 | Variable | | |
| 27 | | 161.144 | 0.814 | 1.497000 | 81.610 |
| 28 | | 35.526 | Variable | | |
| 29 | | 47.332 | 4.482 | 1.647690 | 33.840 |
| 30 | | −32.337 | 0.808 | 2.001000 | 29.130 |
| 31 | | 39.909 | 4.111 | | |
| 32 | | −54.011 | 0.800 | 1.437000 | 95.100 |
| 33 | | 37.034 | 6.874 | 1.717360 | 29.500 |
| 34 | | −31.012 | Variable | | |

TABLE 16-continued

| Surface data No. | R | D | Nd | Vd |
|---|---|---|---|---|
| 35 | −34.214 | 0.800 | 1.729160 | 54.670 |
| 36 | −8790.330 | Variable | | |
| 37 | INF | 2.500 | 1.516800 | 64.200 |
| 38 | INF | 1.000 | | |

Table 17 illustrates the specifications of the zoom lens of Example 6.

TABLE 17

| Specifications | Wide angle | Intermediate | Telephoto |
|---|---|---|---|
| f | 61.846 | 189.603 | 581.950 |
| Fno | 4.600 | 6.500 | 8.400 |
| ω | 18.825 | 6.199 | 2.075 |
| D(5) | 1.000 | 58.068 | 96.164 |
| D(12) | 46.502 | 19.454 | 1.825 |
| D(21) | 14.726 | 6.970 | 1.000 |
| D(26) | 6.888 | 12.104 | 1.002 |
| D(28) | 10.543 | 5.326 | 16.429 |
| D(34) | 25.231 | 22.979 | 11.780 |
| D(36) | 13.489 | 30.321 | 70.200 |

Table 18 illustrates aspheric coefficients of the aspheric surface in the zoom lens of Example 6.

TABLE 18

| Aspheric surface data No. | K | A4 | A6 |
|---|---|---|---|
| 22 | 0.00 | −5.067390E−06 | 6.532070E−09 |
| 23 | 0.00 | 8.552010E−06 | 9.130610E−09 |
| **No.** | **A8** | **A10** | **A12** |
| 22 | −5.488680E−12 | −5.452510E−13 | 2.726130E−15 |
| 34 | −1.558500E−10 | 5.085040E−13 | 2.613270E−16 |

The values calculated by the above expressions in Examples 1 to 6 are illustrated in Table 19.

TABLE 19

| | Example 1 | Example 2 | Example 3 |
|---|---|---|---|
| βm1w | −1.855 | 0.267 | −1.774 |
| mL/fw | −1.323 | −1.296 | −2.925 |
| Lt/ft | 0.746 | 0.593 | 0.763 |
| fC/fM1 | 1.319 | 1.838 | 1.380 |
| f1/fw | 3.792 | 2.817 | 5.668 |
| βm1t/βm1w | 2.244 | −0.106 | 3.407 |
| (1 − βct) × βcrt | 2.400 | 2.401 | 2.400 |
| Ndp | 1.516 | 1.516 | 1.517 |
| vdp | 64.060 | 64.060 | 64.200 |
| fB/fM1 | −0.816 | −2.302 | −0.670 |
| Ndn | 2.001 | 2.001 | 2.001 |
| Xm1/Xm2 | 0.953 | 1.000 | 0.948 |
| β2t/β2w | 4.442 | −30.929 | 5.228 |
| βLt/βLw | 1.519 | 1.973 | 1.454 |
| βRt/βRw | 1.765 | 2.165 | 2.066 |
| $(1 - \beta ft)^2 \times \beta frt^2$ | −9.941 | −10.508 | −11.000 |
| | **Example 4** | **Example 5** | **Example 6** |
| βm1w | −3.179 | −125.499 | 7.188 |
| mL/fw | −0.977 | −0.953 | −0.917 |
| Lt/ft | 0.474 | 0.438 | 0.490 |
| fC/fM1 | 1.738 | 2.757 | 3.556 |
| f1/fw | 2.956 | 2.785 | 2.797 |

TABLE 19-continued

| | Example 1 | Example 2 | Example 3 |
|---|---|---|---|
| βm1t/βm1w | 0.513 | 0.020 | 3.267 |
| (1 − βct) × βcrt | 1.782 | 1.205 | 1.170 |
| Ndp | 1.497 | 1.517 | 1.518 |
| νdp | 81.610 | 64.200 | 58.960 |
| fB/fM1 | −3.397 | −1.763 | −1.261 |
| Ndn | 2.001 | 2.001 | 2.001 |
| Xm1/Xm2 | 0.758 | 0.674 | 0.880 |
| β2t/β2w | 7.610 | 7.975 | 5.372 |
| βLt/βLw | 1.810 | 1.709 | 1.889 |
| βRt/βRw | 2.037 | 2.228 | 1.974 |
| $(1-\beta ft)^2 \times \beta frt^2$ | −11.000 | −11.008 | −10.997 |

What is claimed is:

1. A zoom lens having a plurality of lens groups, the zoom lens comprising, in order from an object side:

a first lens group having positive refractive power;

a second lens group having negative refractive power; and a rear group being a set of lens groups and having positive refractive power as a whole, wherein the rear group includes, in order from an object side, an intermediate lens group M1 having positive refractive power, and an intermediate lens group M2 having positive refractive power, an interval between adjacent lens groups is changed during zooming from a wide angle end to a telephoto end, the intermediate lens group M1 includes, in order from the object side, an A group being a set of lenses and having positive refractive power, a B group being a set of lenses and having negative refractive power, and a C group being a set of lenses and having positive refractive power, and the zoom lens further satisfies either a condition A or a condition B below, the condition A is that at least one lens included in either the intermediate lens group M1 or the intermediate lens group M2 is an anti-vibration lens that moves in a direction intersecting an optical axis of the zoom lens, and when a lens group closest to an image surface side in the rear group is defined as a lens group L, following expressions (1) and (2) are satisfied, $$-1000 < \beta m1w < 0.00 \tag{1}$$

$$-5.00 < mL/fw < -0.01 \tag{2}$$

here,

βm1w is a lateral magnification of the intermediate lens group M1 during infinity focus at a wide angle end, mL is a movement distance of the lens group L during zooming from a wide angle end to a telephoto end when a movement distance from an object side to an image surface side is considered positive, and fw is a focal length of the zoom lens at a wide angle end;

the condition B is that at least one lens included in the intermediate lens group M1 and in a lens group closer to an image surface side than the intermediate lens group M1 is an anti-vibration lens that moves in a direction intersecting an optical axis of the zoom lens, and following expressions (3) and (4) are satisfied, $$0.20 < Lt/ft < 1.30 \tag{3}$$

$$0.10 < fC/fM1 < 9.50 \tag{4}$$

here,

Lt is a total length of the zoom lens at a telephoto end, ft is a focal length of the zoom lens at a telephoto end, fC is a focal length of the C group, and fM1 is a focal length of the intermediate lens group M1.

2. The zoom lens according to claim 1, wherein in the condition A, a following expression (5) is further satisfied:

$$0.10 < Lt/ft < 3.00 \tag{5}$$

here,

Lt is a total length of the zoom lens at a telephoto end, and ft is a focal length of the zoom lens at a telephoto end.

3. The zoom lens according to claim 1, wherein in the condition A, a following expression (6) is further satisfied:

$$0.10 < fC/fM1 < 20.00 \tag{6}$$

here, fC is a focal length of the C group, and fM1 is a focal length of the intermediate lens group M1.

4. The zoom lens according to claim 1, wherein in the condition B, a following expression (7) is further satisfied:

$$-1000 < \beta m1w < 0.00 \tag{7}$$

here,

βm1w is a lateral magnification of the intermediate lens group M1 during infinity focus at a wide angle end.

5. The zoom lens according to claim 1, wherein in the condition B, when a lens group closest to an image surface side is a lens group L, a following expression (8) is satisfied:

$$-5.00 < mL/fw < -0.01 \tag{8}$$

here, mL is a movement distance of the lens group L during zooming from a wide angle end to a telephoto end when a movement distance from an object side to an image surface side is considered positive, and fw is a focal length of the zoom lens at a wide angle end.

6. The zoom lens according to claim 1, satisfying a following expression (9):

$$0.10 < f1/fw < 10.00 \tag{9}$$

here, f1 is a focal length of the first lens group, and fw is a focal length of the zoom lens at a wide angle end.

7. The zoom lens according to claim 1, satisfying a following expression (10):

$$0.90 < \beta m1t/\beta m1w < 10.00 \quad (10)$$

here, $\beta m1w$ is a lateral magnification of the intermediate lens group M1 during infinity focus at a wide angle end, and $\beta m1t$ is a lateral magnification of the intermediate lens group M1 during infinity focus at a telephoto end.

8. The zoom lens according to claim 1, wherein the C group is the anti-vibration lens.

9. The zoom lens according to claim 8, satisfying a following expression (11):

$$0.50 < (1-\beta ct)\times\beta crt < 6.00 \quad (11)$$

here, $\beta ct$ is a lateral magnification of the C group during infinity focus at a telephoto end, and $\beta crt$ is a composite lateral magnification of a lens group closer to an image surface side than the C group during infinity focus at a telephoto end.

10. The zoom lens according to claim 8, wherein the C group has a convex lens and a following expression (12) is satisfied:

$$1.40 < Ndp < 1.75 \quad (12)$$

here,

Ndp is a refractive index of a convex lens in the C group with respect to line d.

11. The zoom lens according to claim 1, wherein the C group has a convex lens and a following expression (13) is satisfied:

$$50 < vdp < 100 \quad (13)$$

here, vdp is an Abbe constant of a convex lens in the C group.

12. The zoom lens of claim 1, wherein the C group has a concave lens.

13. The zoom lens according to claim 1, wherein the B group has a convex lens.

14. The zoom lens according to claim 1, satisfying a following expression (14):

$$-20.00 < fB/fM1 < -0.10 \quad (14)$$

here, fB is a focal length of the B group, and fM1 is a focal length of the intermediate lens group M1.

15. The zoom lens according to claim 1, wherein the B group has a concave lens and a following expression (15) is satisfied:

$$1.70 < Ndn < 2.20 \quad (15)$$

here,

Ndn is a refractive index with respect to the line d of the concave lens in the B group.

16. The zoom lens according to claim 1, satisfying a following expression (16):

$$0.50 < Xm1/Xm2 < 2.00 \quad (16)$$

here,

Xm1 is a movement distance of the intermediate lens group M1 during zooming from a wide angle end to a telephoto end, and Xm2 is a movement distance of the intermediate lens group M2 during zooming from a wide angle end to a telephoto end.

17. The zoom lens according to claim 1, satisfying a following expression (17):

$$1.00 < \beta 2t/\beta 2w < 10.00 \quad (17)$$

here, $\beta 2w$ is a lateral magnification of the second lens group during infinity focus at a wide angle end, and $\beta 2t$ is a lateral magnification of the second lens group during infinity focus at a telephoto end.

18. The zoom lens according to claim 1, wherein a lens group closest to an image surface side is defined as a lens group L, and a following expression (18) is satisfied:

$$1.10 < \beta Lt/\beta Lw < 3.00 \quad (18)$$

here, $\beta Lw$ is a lateral magnification of the lens group L during infinity focus at a wide angle end, and $\beta Lt$ is a lateral magnification of the lens group L during infinity focus at a telephoto end.

19. The zoom lens according to claim 1, wherein when all lenses located closer to an image surface side than the intermediate lens group M2 are defined as R group, a following expression (19) is satisfied:

$$1.50 < \beta Rt/\beta Rw < 5.00 \quad (19)$$

here, $\beta Rw$ is a lateral magnification of the R group during infinity focus at a wide angle end, and $\beta Rt$ is a lateral magnification of the R group during infinity focus at a telephoto end.

20. The zoom lens according to claim 1, wherein when a lens group adjacent to the intermediate lens group M2 on an image surface side is a lens group F, focusing is achieved by moving the lens group F.

21. The zoom lens according to claim 20, wherein the lens group F has a negative refractive power as a whole.

22. The zoom lens according to claim 20, satisfying a following expression (20):

$$-20.00 < (1-\beta ft)^2 \times \beta frt^2 < -1.00 \quad (20)$$

here,

βft is a lateral magnification of the F group during infinity focus at a telephoto end, and βfrt is a composite lateral magnification of a lens group closer to an image surface side than the F group during infinity focus at a telephoto end.

23. The zoom lens according to claim 20, wherein the lens group F includes a single lens.

24. An imaging device comprising:

the zoom lens according to claim 1; and an image sensor on an image surface side of the zoom lens, the image sensor converting an optical image formed by the zoom lens into an electrical signal.

* * * * *